(12) United States Patent
Makhija et al.

(10) Patent No.: US 11,714,624 B2
(45) Date of Patent: Aug. 1, 2023

(54) MANAGING AND DEPLOYING APPLICATIONS IN MULTI-CLOUD ENVIRONMENT

(71) Applicant: NB Ventures, Inc., Clark, NJ (US)

(72) Inventors: Subhash Makhija, Westfield, NJ (US); Huzaifa Matawala, Princeton, NJ (US); Shivendra Singh Malik, Vasco-da-Gama (IN); Abdul Rasheed Nagoor Gani, Fair Lawn, NJ (US); Wael Yousef, Bridgewater, NJ (US)

(73) Assignee: NB Ventures, Inc., Clark, NJ (US)

( * ) Notice: Subject to any disclaimer, the term of this patent is extended or adjusted under 35 U.S.C. 154(b) by 113 days.

(21) Appl. No.: 17/538,389

(22) Filed: Nov. 30, 2021

(65) Prior Publication Data
US 2023/0168874 A1 Jun. 1, 2023

(51) Int. Cl.
*H04L 29/08* (2006.01)
*G06F 9/445* (2018.01)
*G06F 9/455* (2018.01)
*G06N 5/04* (2023.01)
*G06F 8/60* (2018.01)
*G06F 9/451* (2018.01)

(52) U.S. Cl.
CPC ............... *G06F 8/60* (2013.01); *G06F 9/451* (2018.02)

(58) Field of Classification Search
CPC ... G06F 8/60; G06F 9/451; G06F 8/38; G06F 8/61; G06F 21/16; G06F 21/572; G06F 21/606; G06F 21/73; G06Q 10/02
See application file for complete search history.

(56) References Cited

U.S. PATENT DOCUMENTS 11,206,316 B2 * 12/2021 Mathur ............... G06F 9/44505

OTHER PUBLICATIONS

Emeakaroha et al., Towards Automated Cost-Efficient Data Management for Federated Cloud Services, 6 pages (Year: 2016).*

* cited by examiner

*Primary Examiner* — Thuy Dao
(74) *Attorney, Agent, or Firm* — David M. Breiner; BrownWinick Law Firm

(57) ABSTRACT

The present invention provides a system and a method for managing and deploying one or more applications in a multi-cloud environment. The invention structures an application pipeline for multiple cloud environments and creates a library of objects based on processing of one or more application pipeline historical data. The data models generated based on the historical data enable processing of a received data to execute a task of deploying one or more applications. The invention maps blockchain network-based data elements of one or more applications in a multi-cloud environment.

33 Claims, 20 Drawing Sheets

| Request ID | Cloud | Programming Language | Status |
|---|---|---|---|
| 1 | Cloud 1-USE-DEV,Cloud 2-USE-DEV,Cloud 1-USE-QC,Cloud 1-USE-UAT,Cloud 2-USE-UAT,Cloud 2-USE-PRD | C# | Completed |
| 2 | Cloud 1-USE-DEV,Cloud 2-USE-DEV,Cloud 1-USE-QC,Cloud 1-USE-UAT,Cloud 2-USE-UAT,Cloud 2-USE-PRD | C# | Completed |
| 3 | Cloud 1-USE-DEV,Cloud 2-USE-DEV,Cloud 1-USE-QC,Cloud 1-USE-UAT,Cloud 2-USE-UAT,Cloud 2-USE-PRD | JAVA | Failed |
| 4 | Cloud 1-USE-DEV,Cloud 2-USE-DEV,Cloud 1-USE-QC,Cloud 1-USE-UAT,Cloud 2-USE-UAT,Cloud 2-USE-PRD | PYTHON | In progress |
| 5 | Cloud 1-USE-DEV,Cloud 2-USE-QC,Cloud 1-USE-UAT,Cloud 2-USE-UAT,Cloud 2-USE-PRD | JAVA | Completed |
| 6 | Cloud 1-USE-DEV,Cloud 2-USE-DEV,Cloud 1-USE-QC,Cloud 1-USE-UAT,Cloud 2-USE-UAT,Cloud 2-USE-PRD | NODEJS | Completed |
| 7 | Cloud 1-USE-DEV,Cloud 2-USE-DEV,Cloud 1-USE-QC,Cloud 1-USE-UAT,Cloud 2-USE-UAT,Cloud 2-USE-PRD | C# | Completed |
| 8 | Cloud 1-USE-DEV,Cloud 2-USE-DEV,Cloud 1-USE-QC,Cloud 1-USE-UAT,Cloud 2-USE-UAT,Cloud 2-USE-PRD | JAVA | Completed |
| 9 | Cloud 1-USE-DEV,Cloud 2-USE-DEV,Cloud 1-USE-QC,Cloud 1-USE-UAT,Cloud 2-USE-UAT | C# | In progress |
| 10 | Cloud 1-USE-DEV,Cloud 2-USE-DEV,Cloud 1-USE-QC,Cloud 1-USE-UAT,Cloud 2-USE-UAT | C# | In progress |

MANAGING AND DEPLOYING APPLICATIONS IN MULTI-CLOUD ENVIRONMENT

BACKGROUND

1. Technical Field

The present invention relates generally to deployment pipelines for software development and operations in multi-cloud environment. More particularly, the invention relates to a system and a method for managing and deploying one or more applications in a multi-cloud environment.

2. Description of the Prior Art

Enterprise applications have multiple components which are continuously deployed in a cloud. For application development and deployment in a cloud computing environment, the deployment pipelines are crucial. There are prior art applications that mention about pipelines for software Development and Operations (DevOps).

WO2017112801A1 discloses a system and a method for provisioning a deployment pipeline. The prior art invention provides an inheritable and extensible source code template—generally referred to as a live pipeline template (LPT). The live pipeline templates may be used to manage deployment pipelines which, in turn, are used to launch, maintain, and update the services and systems used to host and provide computing services. However, the prior art invention utilizes a standard source code template which is error prone. Moreover, certain components/parameters for deployment pipeline are not even considered for managing the pipeline due to absence of machine leaning and artificial intelligence in considering additional parameters. Further, such deployment pipelines are inherently deficient in implementation for multi-cloud environment. The prior art invention is not capable to process any unknowns which makes it impossible to structure pipelines deployment for multi-cloud environment where different cloud providers may have distinct infrastructure and processing protocols.

U.S. Pat. No. 11,144,289B1 discloses a system and a method for automatically and selectively optimizing, CI/CD pipeline artifacts based on identified changes by learning dependencies between application components and CI/CD pipeline components. The prior art optimizes the existing pipeline artifacts by detecting a change to the artifact(s), and responsive to the detected change, the system leverages the captured relationship to identify an impart of the detected change on the pipeline artifact(s), and selectively optimize the pipeline in response to the identified impact. The optimization includes automatically encoding mapped changes corresponding to the identified impact into the pipeline. The optimized pipeline is then subject to execution. However, such optimized pipelines are not always executable as they are error prone. Moreover, the determination of the change in the application artifact and the related impact on the pipeline is dependent on predefined relationship. In case of an application artifact based on a codeless platform, such relationships are difficult to be pre-defined considering the dynamic nature of the application development in a codeless platform. Further, in case of low code no code-based applications, the optimized pipelines will never work due to high probability of error in deployment of the pipeline. Also, for multi-cloud environment with different infrastructure, restructuring of pipeline is extremely complex.

U.S. Pat. No. 10,977,005B2, discloses a system and method of cognitive development of DevOps pipeline based on similarity algorithm. The similarity algorithm creates a feature map of new pipeline requirements and existing pipeline requirement to determine different requirements of the new pipeline. The preexisting pipeline requirement is selected for the feature map with the highest similarity of features. However, in a multi-cloud environment the similarity feature is error prone since each cloud has different inherent structure and the deployment of pipeline for the application would vary significantly from one cloud environment to another at a configuration level. Moreover, for deployment of application structured through codeless platforms, the identification of pipeline similarity is extremely complex. U.S. Pat. No. 10,977,005B2 uses a tree kernel algorithm which suffer from undesirable boundary effects, where similar data points may be separated into different leaf nodes during the growth of a tree. This causes problem for a similarity kernel for which the similarity of every pair (or most pairs) of points matters, like in case of deployment pipelines. Moreover, any data driven approach for determining similarity is extremely error prone in case of structuring deployment pipelines.

In multi-cloud environment the complexity of creating the deployment pipeline is extremely complex and challenging. In case of applications developed through codeless platforms, the deployment pipeline architecture remains unsupportive. Further, for application supported through blockchain network, the complexity is multi-fold as the infrastructure requirement of in a cloud environment differs significantly. In case the application supported by a blockchain implemented network is deployed on one cloud environment and it needs to be deployed to a different cloud environment, then the implementations challenges are extremely cumbersome.

In view of the above problems, there is a need for systems, and methods for deployment of one or more applications can overcome the problems associated with the prior arts.

SUMMARY

According to an embodiment, the present invention provides a system and a method of managing and deploying one or more applications in a multi-cloud environment. The invention includes receiving at least one input data at a server through an electronic user interface, extracting one or more data attributes associated with the at least one input data, fetching at least one data serialization and configuration (DSC) object from a database based on the extracted data attributes wherein one or more processors are coupled to an AI engine to process the extracted data attributes for identifying the DSC file to be fetched, and identifying and deploying one or more application deployment pipelines based on the fetched DSC file to structure the one or more applications.

In an embodiment, the present invention provides a non-transitory computer program product to manage and deploy one or more application in a multi cloud environment. The product includes a computer readable storage medium readable by one or more processor and storing instructions for execution by the one or more processor for performing the above method.

In an advantageous aspect, the system and method of the invention structures a data serialization and configuration object connection dynamically with model driven AI (artificial intelligence) to identify relationships for structuring one or more application deployment pipelines. The system of the present invention with the codeless platform caters to multiple variations and technology stack, validates the inter dependencies for multiple libraries and binaries. Also, the system factors the dependencies on metadata driven approach for Low code platform where the versions between metadata and dependencies between metadata is considered. Dependencies in the UI metadata and various versions are created to manage micro-front sections and Form attributes. Also, the system and method of the present invention maps blockchain network-based data elements of one or more applications in a multi-cloud environment.

Further, the present invention utilizes Machine Learning algorithms, prediction data models, graphical data models, artificial intelligence-based processes for structuring a deployment pipeline for one or more applications. Moreover, the deployment pipelines enable faster and less error prone structuring of one or more application.

BRIEF DESCRIPTION OF THE DRAWINGS

The disclosure will be better understood and when consideration is given to the drawings and the detailed description which follows. Such description makes reference to the annexed drawings wherein:

FIG. 6 is a user interface showing multi-cloud environment deployment for an application in accordance with an embodiment of the invention.

FIG. 6A is a user interface showing a new request for deployment of an application in accordance with an embodiment of the invention.

DETAILED DESCRIPTION

Figure 1:
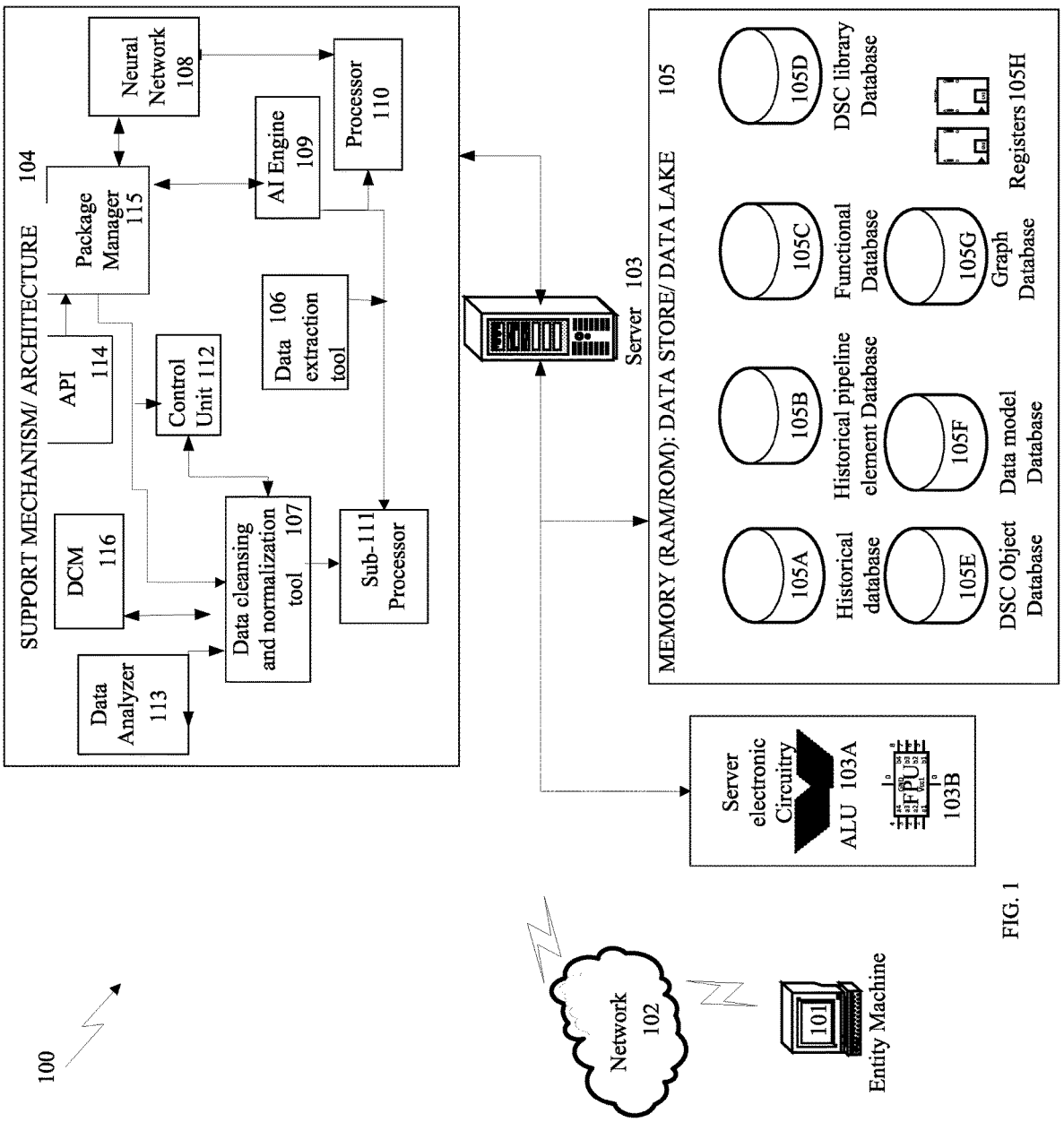
FIG. 1 is a diagram of a system for managing and deploying one or more applications in accordance with an example embodiment of the invention.

Described herein are the various embodiments of the present invention, which includes a system and a method of managing and deploying one or more applications in a multi-cloud environment.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "links," "nodes," or "connectors"," and the like, may be used herein for ease of description to describe one element or feature's relationship to another element(s) or feature(s) as illustrated in the figures. It will be understood that the spatially relative terms are intended to encompass different workflows of the process in use or operation in addition to the workflows depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to managing and deploying one or more application in a multi-cloud environment.

Referring to FIG. 1, a system diagram 100 for managing and deploying one or more application in a multi-cloud environment is provided in accordance with an embodiment of the present invention. The system 100 is configured to deploy supply chain management (SCM) applications executing complex operations and being structured through use of configurable components of a codeless platform architecture. The system 100 includes an entity machine 101 configured to receive at least one input on the electronic user interface (UI) 101A. Further, depending on the type of user, the user interface (UI) 101A of the entity machine 101 is structured to enable deployment of application pipelines. The entity machine 101 with the UI 101A is configured for sending, receiving, modifying or triggering one or more application deployment processes and data object for creation of one or more SCM application pipeline over a network 102. The system includes a server 103 for receiving at least one input data from the entity machine 101, a support architecture/mechanism 104 configured for executing multiple data processing actions to enable deployment of application in a multi-cloud environment. The support architecture/mechanism 104 performs various prediction through AI engine and mitigation processes with multiple functions including historical dataset extraction, classification of historical datasets, artificial intelligence-based processing of new datasets and structuring of data attributes for analysis of data, creation of one or more data models configured to process different parameters, structuring of workflows etc. The system further includes a memory store/data lake 105 configured for storing a plurality of historical data objects, data models etc., to be processed for deploying one or more SCM application.

In an embodiment, the system is provided in a cloud or cloud-based computing environment. The codeless platform based built application deployment enables more secured processes.

In an example embodiment, the layered architecture of the one or more applications deployed in a multi-cloud environment enables faster processing of complex operations as the workflow may be reorganized dynamically using the configurable components. The layered architecture includes a data layer, a foundation layer, a shared framework layer, an application layer and a customization layer. Each layer of the architecture includes a plurality of configurable components interacting with each other to execute at least one operation of the SCM enterprise application. It shall be apparent to a person skilled in the art that while some components of the system are explained in the example embodiment, the nature of the components itself enables redesigning of the platform architecture through addition, deletion, modification of the configurable components, metadata and their positioning in the layered architecture. Such addition, modification of the components depending on the nature of the architecture layer function shall be within the scope of this invention.

In an embodiment the SCM application structured with codeless platform provides an end user application UI and a citizen developer user application UI for structuring the interface to carry out the required operations.

In one embodiment, the codeless platform architecture provides the cloud agnostic data layer as a bottom layer of the architecture. This layer provides a set of micro-services that collectively enable discovery, lookup and matching of storage capabilities to needs for execution of operational requirement. The layer enables routing of requests to the appropriate storage adaptation, translation of any requests to a format understandable to the underlying storage engine (relational, key-value, document, graph, etc.). Further, the layer manages connection pooling and communication with the underlying storage provider and automatically scales and de-scaling the underlying storage infrastructure to support operational growth demands. The foundation layer micro services enable provisioning (on boarding new client entity and documents), deployment and scaling of necessary infrastructure to support multi-tenant use of the platform. The set of microservices of foundation layer are the only way any higher layer microservice can talk to the data layer microservices. Further, machine learning techniques auto-scale the platforms to optimize costs and recommend deployment options for entity such as switching to other cloud vendors etc.

In a related embodiment, the plurality of configurable components includes one or more data layer configurable components including but not limited to Query builder, graph database parser, data service connector, transaction handler, document structure parser, event store parser and tenant access manager. The data layer provides abstracted layers to the SCM service to perform data operations like Query, insert, update, delete and join on various types of data stores document database (DB) structure, relational structure, key value structure and hierarchical structure.

The computing devices referred to as the entity machine 101, server 103 etc. of the present invention are intended to represent various forms of digital computers, such as laptops, desktops, workstations, personal digital assistants, and other appropriate computers. The entity machine 101 may communicate with the server 103 wirelessly through communication interface, which may include digital signal processing circuitry. Computing device of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an embodiment the server 103 of the invention may include various sub-servers for communicating and processing data across the network. The sub-servers include but are not limited to content management server, application server, directory server, database server, mobile information server and real-time communication server.

In example embodiment the server 103 shall include electronic circuitry for enabling execution of various steps by processor. The electronic circuitry has various elements including but not limited to a plurality of arithmetic logic units (ALU) 103A and floating-point Units (FPU's) 103B. The ALU 103A enables processing of binary integers to assist in formation of at least one table of data attributes where the data models implemented for dataset characteristic prediction are applied to the data table for obtaining prediction data and recommending action for application deployment in a multi-cloud environment. In an example embodiment the server electronic circuitry includes at least one Athematic logic unit (ALU), floating point units (FPU), other processors, memory, storage devices, high-speed interfaces connected through buses for connecting to memory and high-speed expansion ports, and a low-speed interface connecting to low-speed bus and storage device. Each of the components of the electronic circuitry, are interconnected using various busses, and may be mounted on a common motherboard or in other manners as appropriate. The processor can process instructions for execution within the server 108, including instructions stored in the memory or on the storage devices to display graphical information for a graphical user interface (GUI) on an external input/output device, such as display coupled to high-speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

In an embodiment, the support architecture 104 includes a data extraction tool 106 for extracting one or more data attributes from at least one input data received at a server 103. The tool identifies a type of input data and sends the input data to at least one data recognition training model for identification of the one or more attribute. The data recognition training model processes the input data based on prediction analysis by a bot for obtaining the data attribute with a confidence score. The architecture 104 includes a data cleansing and normalization tool 107 for cleaning and normalizing a historical dataset related to one or more application deployment pipeline. Further the architecture 104 includes a neural network 108 configured to receive a prediction dataset as input and a testing data set as output to identify one or more data attribute weights for determining accuracy and confidence score of the prediction dataset. The support architecture 104 further includes an AI engine 109 coupled to a processor 110 and configured to process one or more data elements of a historical database to recommend one or more DSC data library elements for structuring of a DSC data library and creating at least one DSC object. The AI engine 109 is configured to orchestrate deployment of the pipeline by determining one or more dependencies of the one or more application the one or more pipeline elements.

The processor 110 may be implemented as a chipset of chips that include separate and multiple analog and digital processors. The processor 110 may provide coordination of the other components, such as controlling user interfaces, applications run by devices, and wireless communication by devices. The Processor 110 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user and convert them for submission to the processor. In addition, an external interface may be provided in communication with processor 110, so as to enable near area communication of device with other devices. External interface may provide, for example, for wired communication in some implementations, or for wireless communication in other implementations, and multiple interfaces may also be used.

In an example embodiment, the system of the present invention includes a front-end web server communicatively coupled to at least one database server 103, where the front-end web server is configured to process the data serialization and configuration (DSC) object characteristic data based on one or more prediction data models and applying an AI based dynamic processing logic to automate application deployment actions through pipelines to structure application workflow.

The support architecture 104 also includes one or more sub-processors 111 configured for processing the received input data related to deployment of one or more application in a multi-cloud environment by analyzing the input data before mapping the attributes with the historical data. The mapping of the historical data is executed by a bot through a data mapping script. The support mechanism 104 includes a control unit 112 encoded with instructions enabling the control unit to function as a bot for identifying and selecting an AI based dynamic processing logic using to execute one or more processing tasks. The architecture includes a data analyzer 113 configured for analyzing metadata related to one or more application. The processor 110 coupled to the AI engine 109 processes the metadata through the data analyzer 113 for identifying change in the metadata of one or more applications in real time. Data Analyzer 113 is an in-memory engine running on multi node servers. Further, the engines including computational or operational engines refers to predefined rules configured for enabling the processor to process data for analysis. The rules are composed of JSON structures, allowing it easy to configure and human readable. The application deployment pipeline accommodates the change of metadata in the application for deployment by triggering corresponding processing task with the one or more pipeline data elements to ensure real time changes to the application being deployed on a different cloud infrastructure environment. Further, the support architecture includes an API 114 configured to be invoked dynamically through a user interface to create one or more application deployment pipelines.

In a related embodiment, the system support architecture 104 provides package management through a package manager 115 (FIG. 1). The package manager 115 is responsible to bundle and manage versions of deployment packages keeping track of the owners and approval for the packages. The information from package manager 115 is exposed as API for other sub-components to consume the information. The Control Unit 112 orchestrates steps and connects with various between data cleansing and data analyzer sub-components. The outcome of Control Unit 112 and AI engine 109 is feed into package manager 115. The package manager 115 component plays a larger role to manage and deploy package through automation process, using various sub-components such as Tenant Configurator, version management, Release manager, Deployment Manager, Infrastructure configurator and application manager. These components provide window for platform developer, application developer to release the packages and provide visibility of the deployment pipeline in multi-cloud environment. The tenant configurator enables deployment of packages to one or more clients across environments. It provides ability to create and manage details of customers through UI. It gives deployment experience through projects and environments to support the tenant concept. The Version management component manages multiple versions of the packages and changes made by application developers and platform developers. The component provides UI to look at multiple versions of the package and compare versions. It manages minor and major versions. The release manager component is responsible for managing, planning, scheduling, and controlling delivery throughout the release lifecycle using other subcomponents and for Orchestrating entire deployment pipeline with automation. The deployment manager component configures and run delivery workflows for deploying applications across multi-cloud environment. The component automates workflows, including versioning, pipeline element generation, application package generation, artifact management, and package promotion to different stages in the workflow. The infrastructure configurator component is responsible to provision services and database repositories as per application and loads. The component supports automation to provision infrastructure as per release and version. The application manager component enables structuring of multiple versions of applications developed by application developer on the screen and allows tenant and customers to select the version.

In another embodiment, the support architecture 104 includes a distributed cloud manager (DCM) 116 configured to manage cloud computing services including applications, data and services residing in the cloud. The Cloud manager ensures resource distribution, monitoring, data integration and application pipeline element viability for structuring the applications in multi-loud environment. Further, DCM resolved any operational inconsistencies that may occur in multi-cloud environment.

In an embodiment, the memory store/data lake 105 includes a historical database 104A for storing historical data related to application to be deployed, cloud environment etc. The memory store 105 also includes a historical pipeline element database 105B configured for storing one or more pipeline elements for structuring the application deployed in multi-cloud environment. The store 105 also includes functional database 105C storing a library of functions utilized with one or more data scripts generated by a bot and created for identifying and deploying the one or more deployment pipeline, Data serialization and configuration (DSC) library database 105D configured for storing one or more data elements for structuring a DSC object. The store 105 further includes a DSC object database 105E configured for storing one or more DSC object, a data model database 105F for storing one or more data models including data recognition training data model, clustering data model, prediction data model, a graph database 105G configured for utilizing graph structures for semantic queries with nodes, edges, and properties to represent and store data. The store 105 also includes a plurality of registers 105H configured for temporarily storing data from various databases to enable transfer of data by the processor 110 between the databases as per the instructions of the AI engine 109 to enable processing of received input data.

The memory data store/data lake 105 of the data layer/storage platform layer may be a volatile, a non-volatile memory or memory may also be another form of computer-readable medium, such as a magnetic or optical disk. The memory store may also include storage device capable of providing mass storage. In one implementation, the storage device may be or contain a computer-readable medium, such as a floppy disk device, a hard disk device, an optical disk device, or a tape device, a flash memory or other similar solid-state memory device, or an array of devices, including devices in a storage area network or other configurations.

In an embodiment, the application deployment system and method include integrating blockchain services with the one or more SCM application and interaction with one or more configurable components of the codeless platform. The deployment pipeline is configured to accommodate for access to blockchain implemented services of an application in one cloud environment even when application is deployed at another cloud environment. The multi-cloud implementations make it extremely challenging to overcome the unknowns, however, the processor coupled to the AI engine enables processing the access control scripts, security parameters, other rules and protocols of an application while deploying the application in another cloud environment. Unlike database implementations where a back-up for application data may enable implementation in different environment, for a blockchain implemented system the deployment pipeline is configured to accommodate for such access with one or more branches of the blockchain structured with provision to connect to another cloud infrastructure environment for the same application. The hash implemented functions in blockchain enables faster implementations and mapping of application elements in one cloud to another. Further, container-based infrastructure may host both blockchain reference or ledger and application. The blockchain implementation enables automation framework for delivering easy to implement blockchain network on distinct cloud-based infrastructures. The blockchain for multi-cloud environment provides security, scalability and acceleration. The access policy and terms are defined and stored in the repository and at the time of deployment of application the pipeline is structured to embed the blockchain policy for enabling access related to the application in another cloud environment. Further, the container orchestration platform consists of the services that are used to deploy desired state of various services of the application on the clusters. It is also used for maintenance and operations of these services. The blockchain implementation utilizes packaging files describing container resources for deployment.

In a related embodiment, the blockchain network provides inter cluster communication by the control unit to enable GRPC service from one containerized cluster to connect with another containerized cluster. The system of the invention enables accessing one or more application object of a blockchain network through the deployment pipeline elements where one or more branches of the blockchain network is configured to connect the one or more application object to one or more cloud environment.

In an embodiment, the present invention uses GPUs (Graphical processing units) for enabling AI engine to provide computing power to processes humongous amount of data.

In an exemplary embodiment, the AI engine employs machine learning techniques that learn patterns and generate insights from the data serialization and configuration library for enabling the processor to automate application deployment operations. Further, the AI engine with ML employs deep learning that utilizes artificial neural networks to mimic neural network. The artificial neural networks analyze data to determine associations and provide meaning to unidentified or new input data to generate data serialization and configuration object. For the purpose of explanation, the AI engine has been described in singular form however, it shall be apparent to a person skilled in the art that an AI engine can be ensemble of a plurality of sub-AI engines interacting with each other and system components for executing one or more tasks.

In another embodiment, the invention enables integration of Application Programming Interfaces (APIs) for plugging aspects of AI into the application deployment pipeline.

In an exemplary embodiment, the application deployment pipeline structure is shown on a deployment visualization tool. The tool shows the structure of the run-time system. The tool captures the hardware that will be used to implement the system and the links between different items of hardware. The visualization tool models physical hardware elements and the communication paths between them thereby projecting the architecture of a system. Further, the tool is configured to provide the deployment of software components or nodes.

The deployment pipeline visualization includes processing of deployment infrastructure knowledge with declarative and deterministic artificial intelligence (AI) which deals with controlled section of application operational logic. Further, the processes include interpretation of regulations and policies to be applied for the application deployment pipeline.

In a related embodiment, the model-driven AI flow with the codeless platform architecture enables users to access data in a unified manner regardless of the underlying data store. Data store queries (e.g., relational, or file systems) are significantly streamlined for structuring the workflow. The essential aspects of time and space, data normalizing, versioning, and tracking are all handled by the system.

In an exemplary embodiment, the system provides a deployment application user interface (UI) to structure the application deployment pipelines. The UI enables cognitive computing to improve interaction between user and a deployment platform. The interface improves the ability of a user to use the computer machine itself. Since, the interface triggers application deployment pipeline elements, the interface thereby enables a user to take informed decision or undertake an appropriate strategy for adjusting pipeline structure with its required elements.

Figure 1A:
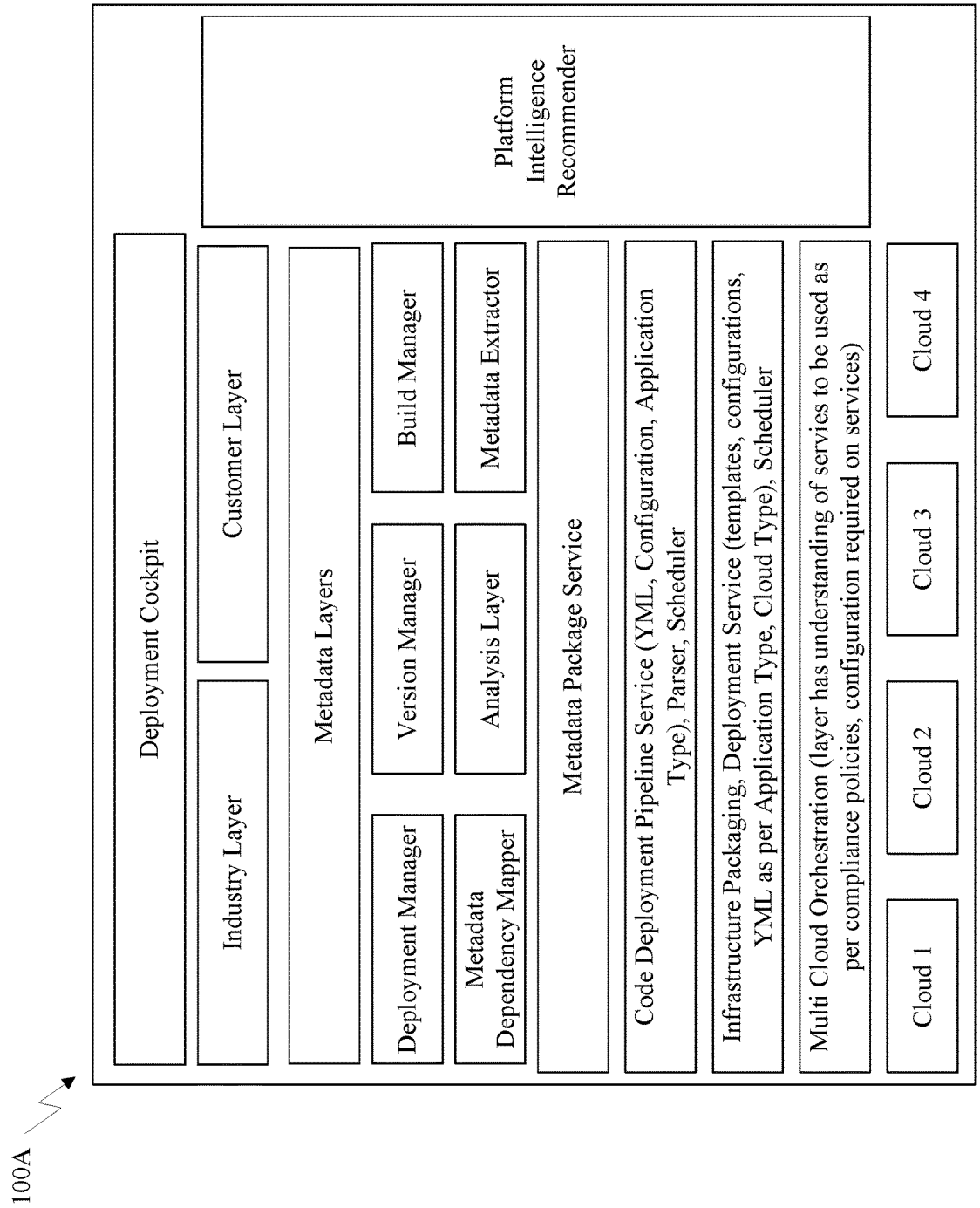
FIG. 1A is a deployment layered architecture diagram of the system for managing and deploying one or more applications in accordance with an example embodiment of the invention.

Referring to FIG. 1A, a deployment layered architecture diagram 100A of a system for managing and deploying one or more application pipeline is provided in accordance with an example embodiment of the invention. The layered architecture diagram 100A includes a deployment cockpit, Industry layer, entity layer, metadata layer, deployment manager, metadata dependency mapper, version manager, analysis layer, build manager, metadata extractor, metadata package service, code deployment pipeline service (DSC, Configuration, Application Type), Parser, code deployment Scheduler, Infrastructure Packaging, Deployment Service (templates, configurations, DSC as per Application Type, Cloud Type), Infrastructure Scheduler, Multi Cloud Orchestration (layer has understanding of services to be used as per compliance policies, configuration required on services), and platform intelligence recommender (PIR). The PIR generates pipeline and configuration, security and cloud service sizing, application type compiler recommendations and provides Recommendation API.

In a related embodiment, Scheduler job runs the Recommender Parser service. The service calls the Recommender API to retrieve Recommender recommendations for the Codeless platform and Apps deployed for the entity. It parses information. Further, other ancillary platform deployment services are used in the pipeline for the purposes of tracking processed recommendations, generating notifications on build completion and storing pipeline state. The metadata layer includes Domain Model, Storage Model, Query Business Rules, UI Forms. Form Expressions, Business Process Flow, Approval Flow, State and Events, Field Validations, Custom Fields. UI Field Attributes, UI Labels, UI Layouts and Sections.

Figure 1B:
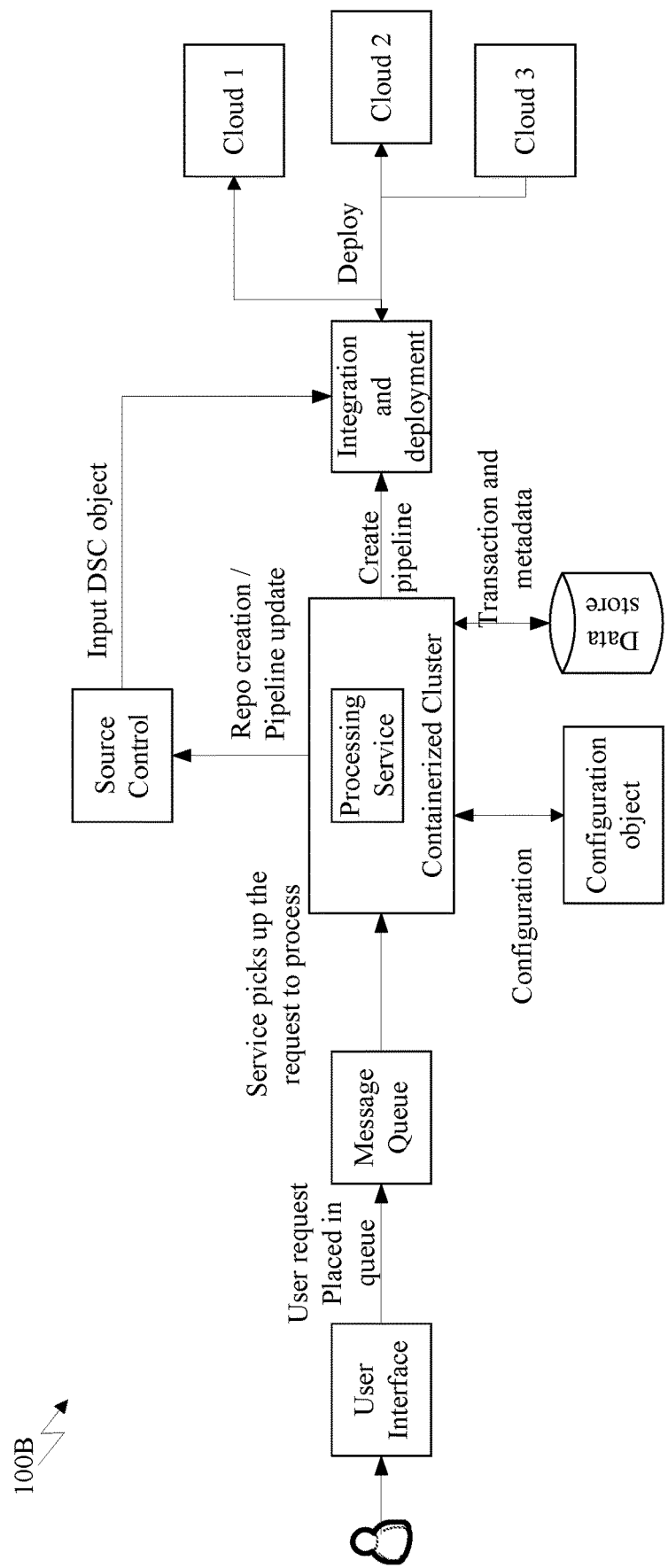
FIG. 1B is an architecture flow diagram of the system for managing and deploying one or more applications in accordance with an example embodiment of the invention.

Referring to FIG. 1B, is an architecture flow diagram 100B of the system for managing and deploying one or more applications in accordance with an example embodiment of the invention. The architecture 100B includes receiving a user request and placing it in a queue until the service picks up the request message from the queue to process by an orchestration cluster like a container orchestration cluster. The orchestration cluster receives configuration object and transaction and metadata to create a repository of DSC objects and provide it to a source control. The processing service generates pipeline for deployment of applications and integration based on DSC object received from the source control. The application is then deployed in multi-cloud environment.

In a related embodiment, an application server accesses application template files to configure and deploy an application to the container orchestration cluster by API interacting with a set of cluster nodes. The application server, the API, the cluster nodes, and the entity devices may each be implemented in a computer system, in whole or in part, as described in this disclosure. The containerized orchestration cluster may include a communication module for transferring data to and from cluster nodes, a user interface module for the cluster, a database module and a storage module all configured to communicate with each other. Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, nodules described herein as being implemented within a single machine, database, or device may be distributed across multiple machines, databases, or devices.

In an example embodiment, the UI helps the user to create a request and see the status of the request. The UI comes with the request creation form in which the user selects options to create a code repository, application type, target cloud and its region. Once the user submits the request the UI helps the user to see the status of his/her request. It also has report show the details like how many applications are deployed, where it deployed and which version of the application deployed etc. When the user submits the request, all the selected values are converted as JSON format and placed in a queue. The user is notified that the request has been received and it is in queue. Further, all the DSC object libraries to create build and release pipelines are pre-loaded into the source control repository. The processing service picks the request from the queue and start processing it based on the parameters passed. If the request is to create a new application and pipeline, then based on the application type it creates a new repository and adds the scaffolding code. When a new file is committed to Source code repository this pipeline will trigger automatically to build and deploy the artifacts in respective cloud region.

In an exemplary embodiment, the system of the present invention provides creation of deployment pipeline that includes common repository and templates containing all metadata information and applications can be built on top using these templates in a multi-cloud environment. This enables faster deployment and structuring of applications.

Figure 2:
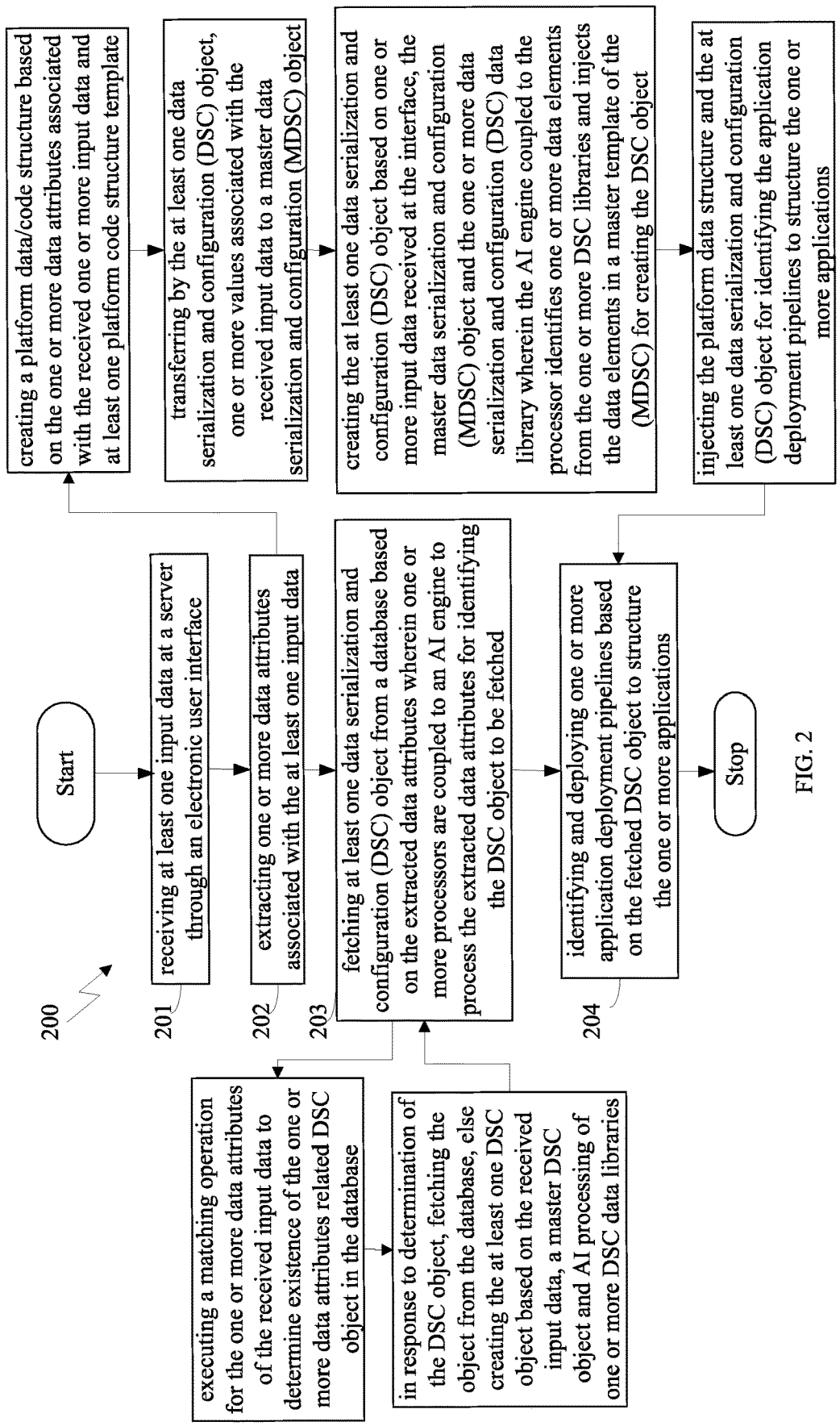
FIG. 2 is a flowchart depicting a method for managing and deploying one or more application in a multi-cloud environment in accordance with an embodiment of the invention.

Referring to FIG. 2 a flowchart 200 depicting a method for managing and deploying one or more application in a multi-cloud environment is shown in accordance with an embodiment of the invention. The method includes the steps of 201 receiving at least one input data at a server through an electronic user interface. In step 202 extracting one or more data attributes associated with the at least one input. In step 203 fetching at least one data serialization and configuration (DSC) object from a database based on the extracted data attributes wherein a processor coupled to an AI engine processes the extracted data attributes for identifying the DSC file to be fetched, and in step 204 identifying and deploying one or more application deployment pipelines based on the fetched DSC file to structure the one or more application.

In a related embodiment, the step of identifying the at least one data serialization and configuration object includes executing a matching operation for the one or more data attributes of the received input data to determine existence of the one or more data attributes related DSC object in the database; and in response to determination of the DSC object, fetching the object from the database, else creating the at least one DSC object based on the received input data, a master DSC object and AI processing of one or more DSC data library.

In another related embodiment, the method of the invention includes identifying the application deployment pipeline for structuring the one or more application in a multi-cloud environment by creating the DSC object. The method includes creating a platform data/code structure based on the one or more data attributes associated with the received one or more input data and at least one platform code structure template. The method also includes transferring by the at least one data serialization and configuration (DSC) object, one or more values associated with the received input data to a master data serialization and configuration (MDSC) object. The method of managing and deploying one or more application further includes creating the at least one data serialization and configuration (DSC) object based on one or more input data received at the interface, the master data serialization and configuration (MDSC) object and the one or more data serialization and configuration (DSC) data library wherein the AI engine coupled to the processor identifies one or more data elements from the one or more DSC library and injects the data elements in a master template of the (MDSC) for creating the DSC object. The method includes injecting the platform data structure and the at least one data serialization and configuration (DSC) object for identifying the application deployment pipeline to structure the one or more application.

In an embodiment, the at least one data serialization and configuration (DSC) object is an application DSC object or a cloud DSC object. The DSC object enables creation of configuration files/elements for structuring application deployment pipelines in a multi-cloud environment where every cloud environment may have distinct infrastructure and processing components. The system and method of the invention facilitates learning of one or more deployment pipeline elements by AI engine and machine learning techniques to process DSC library and enable generation of DSC objects even with new input data having distinct data attributes indicating deployment of one or more applications in multi-cloud environment.

In another embodiment, the one or more applications are developed on a codeless platform architecture based on one or more configurable components thereby requiring the AI engine to process continuously restructured DSC data library elements of application DSC object and associated pipeline elements for deployment of the pipelines.

In an embodiment, the AI engine is configured to orchestrate deployment of the pipeline by determining one or more dependencies of the one or more application and one or more pipeline elements. The one or more dependencies include changes in metadata of the one or more application developed on the codeless platform architecture requiring changes in the one or more pipeline elements for deploying the one or more application with the changed metadata.

In a related embodiment, the one or more dependencies and the one or more data elements from the one or more DSC libraries are determined by ensemble of recursive data space partitioning wherein data points falling in a same data node after the data space partitioning are selected, the ensemble enables selection of data points separated into different nodes during data space expansion as the data points separated in one data space meets in another data space.

Further, one or more clustering data model developed based on a spectral clustering and an ensemble clustering enables processing of the one or more dependencies and the one or more data element from the one or more DSC libraries. Spectral clustering identifies communities of nodes in a graph based on the edges connecting them. It is flexible and allows clustering of non-graph data as well. Spectral clustering uses information from eigenvalues (spectrum) of data matrices built from the graph or the data set. The AI engine enables generation of data matrices including adjacency matrix, degree matrix, interpretation of their spectrum, and using the eigenvectors to assign data to clusters. Spectral clustering enables forming a graph between the data points. The edges of the graph capture the similarities between the points. The eigenvalue of a Graph Laplacian is then be used to find the best number of clusters, and the eigenvectors are used to find the actual cluster labels.

In a related embodiment, ensemble clustering combines multiple clustering models to produce a better result than that of the individual clustering algorithms in terms of consistency and quality. For eg; a clustering ensemble algorithm employs two similarity measures, cluster similarity and a newly defined relationship similarity, and works adaptively through different stages including transforming initial clusters into a binary representation, aggregating the initial clusters that are most similar based on the cluster similarity measure between clusters which iterates itself adaptively until the intended candidate clusters are generated and, refining the clusters by dealing with uncertain Objects to produce an improved final clustering result with the desired number of clusters. Further, the ensemble clustering for graph uses multiple runs of the single-level algorithms to build an ensemble of weak (or local) partitioning of the nodes. The data space partition of the nodes is extremely crucial, and the present invention utilizes recursive space partitioning.

In an example embodiment, the ensemble of randomly projecting recursive data space partitioning includes possibility of projection selection during growth of the data space. Instead of splitting the nodes along coordinate axes, the data space is recursively split along randomly chosen directions. The method of the present invention combines the power of ensemble and flexibility of the data space projections. As the invention uses randomized data space as its building block, is has several desired characteristics of the data space partitioning. The data space methods are invariant with respect to monotonic transformations of the data. The method is extremely efficient with a log linear (i.e. $O(n \log(n))$ average computational complexity for growth and $O(\log(n))$ for search where n is the number of data points. As the method includes recursive data space partitioning, the data points falling in the same node are likely to be similar. This property is often leveraged for large scale computation etc. Further, the data space partitioning enables overcoming data sparsity and data closeness issues. Also, the ensemble nature of the data space partitioning effectively overcomes any boundary effect as by ensemble, data points separated in one part of the data space partitioning may meet in another part of the data space, thereby reducing the chances of separating nearby points exponentially. The dissimilar or far-away points would unlikely end up in the same node, because the diameter of the data space partitioning nodes keep on shrinking during the data space growth, and eventually those dissimilar data points would be separated if they are far away enough.

In a related embodiment, the split of the node say, "B", in the data space partitioning will be along a randomly generated direction, "d". This direction "d" is randomly generated by the AI engine of the invention. The AI engine has multiple ways to randomly spit the node "B" into its child nodes, like $B_1$ and $B_2$. One option is to select a point, say "p", uniformly at random over the interval formed by the projection for all points in "B" onto "d". For a point y∈B, its projection onto "d" is given by:

$$\frac{d \cdot y}{|d|^2}(d),$$

where · indicates a dot product.
The projection coefficient of points in B along direction "d" are $B_d=\{d \cdot y : y \in B\}$
Projection coefficient of the splitting point is "k", then, the child $B_1$ is given as:
$B_1=\{y \in B : d \cdot y < k\}$ and the child $B_2$ is given by the rest of the points.

In an exemplary embodiment, the method enables nearest neighbor search for data mining, machine learning, statistics and any other applications including identification of data elements from one or more DSC library for structuring of deployment pipeline.

In an advantageous aspect, the present invention provides a data-driven approach to learn similarity and dissimilarity kernel from the data by the data space partitioning. It combines the power of ensemble and the flexibility of data space partitioning. The method is simple to implement, and readily adapt to the geometry of the data. As an ensemble method, it can easily run on clustered or multi-core computers. Further, the method develops a learning on the property of the kernel that similar objects would have high similarity value while low similarity value for dissimilar objects. The similarity values have a native interpretation as the probability of points staying in the same data space node during the growth of data space partitioning. The kernel enables the processor to develop a highly competitive clustering mechanism, which includes spectral clustering and an ensemble clustering method.

In an embodiment, the processor coupled to the AI engine is configured to identify one or more data models for processing the received input to determine requirement for creation of the data serialization and configuration (DSC) object.

While the invention describes Artificial intelligence (AI) engine and Machine learning algorithms for processing one or more datasets to identify relationships and dependencies for deploying one or more applications in a multi-cloud environment, with one or more examples of natural language processing (NLP) techniques, the system and method of the present invention may generate any supervised, semi-supervised, unsupervised and reinforcement type machine learning algorithm to derive the relationships between application objects, blockchain network elements and one or more pipeline deployment elements for executing application deployment in multi-cloud environment.

In an embodiment, a data extraction process for extracting one or more data attributes of the at least one received input includes the steps of identifying a type of input data and sending the input data to at least one data recognition training model for identification of the one or more data attribute wherein the data recognition training model processes the input data based on prediction analysis by a bot for obtaining the data attribute with a confidence score.

In an embodiment, the one or more data models are created by receiving, cleansing and normalizing a historical dataset, dividing the normalized dataset into training dataset and testing dataset, generating the one or more data model based on the training dataset and the testing dataset, generating a prediction dataset for the testing dataset using the training data set through the one or more data models, providing the prediction dataset as input to a neural network and testing data as output to identify one or more data attribute weights for determining accuracy and confidence score of the prediction dataset, and in response to determination of accuracy and confidence score to be above a threshold value, storing the dataset in a historical database. The historical database includes programming language data, versioning data, application data, cloud data, and deployment pipeline data elements.

In an embodiment, the AI engine processes one or more data elements of the historical database to recommend one or more DSC data library elements for structuring of the DSC library and creating the at least one DSC object based on processing of one or more data elements of the historical database.

While the historical database is referred to as including historical datasets enabling creation of one or more data models, it is not intended to limit the dataset that is being processed to train models for multiple functions. The historical database includes one or more historical datasets such as historical supply chain management application data, historical pipeline structuring data, blockchain network and application relationship data, etc.

In an embodiment, the method of maintaining and deploying one or more application in a multi-cloud environment includes generating by a bot one or more data scripts created for identifying and deploying the one or more deployment pipeline by utilizing a library of functions stored on functional database, wherein the data scripts are backend scripts created by the bot based on the one or more pipeline data elements, at least one received input and AI processing for enabling automation of the DSC object creation, identification and deployment of the deployment pipeline.

In an embodiment, the one or more data attributes of the at least one input include cloud type, application type, database type, application security compliance and regional requirement, customer hosted region requirement, line of operation, and environment including development, Quality Assurance, User Acceptance Testing, and production.

In an embodiment, the database type includes relational, non-relational, graph database, file storage, audit storage, search storage, logs storage, analytical storage, big data storage, reporting storage and the regional requirement includes Payment card industry (PCI), Sarbanes-Oxley Act (SOX), Health Insurance portability and accountancy act (HIPAA), Health information trust alliance (HITRUST), Federation risk and authorization management program (Fedramp), General data protection regulation (GDPR), Fintech, ISO, RBI and IRDAI, SOC 1, SOC 2, and SOC 3.

Figure 3:
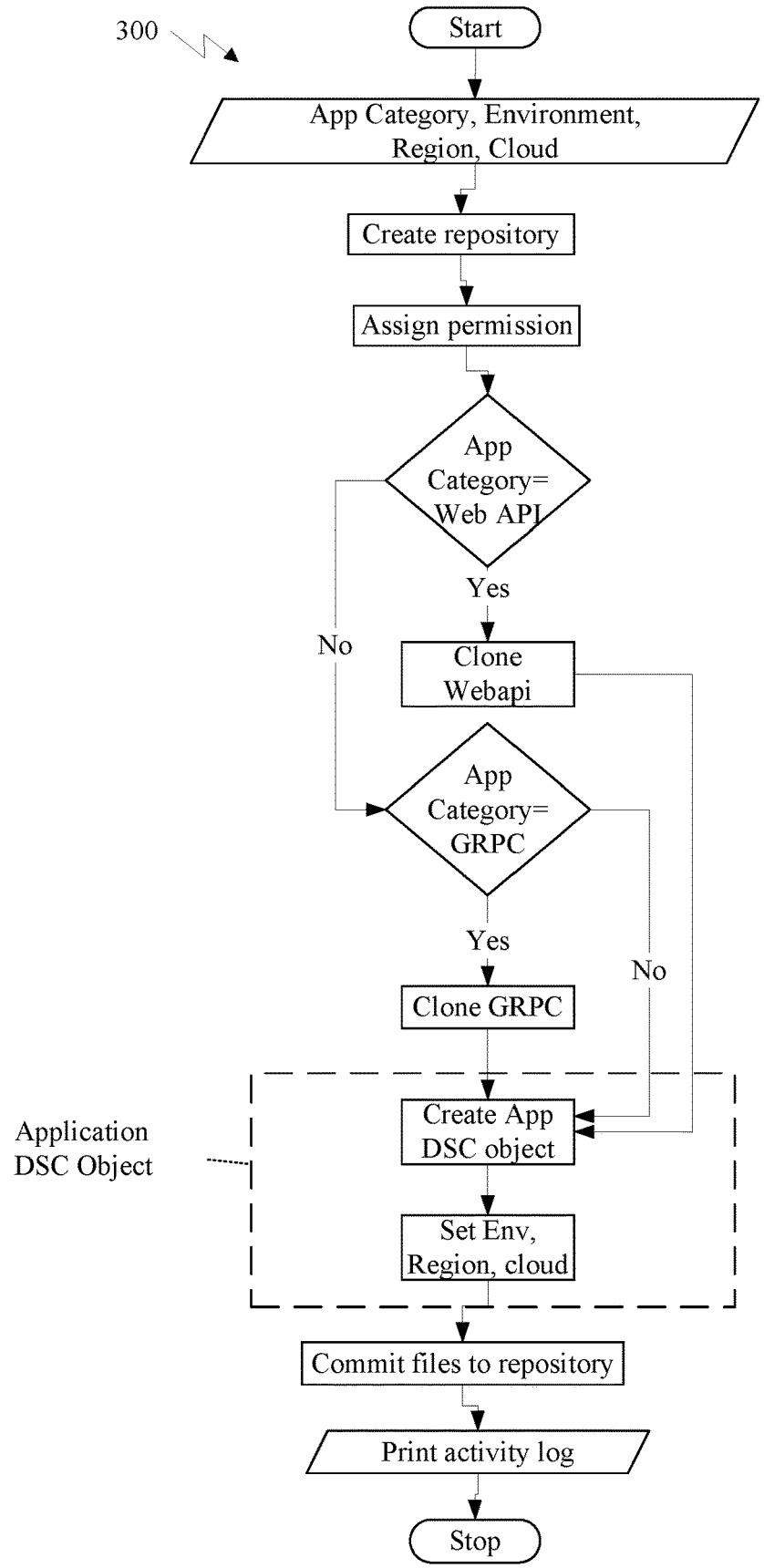
FIG. 3 is a flow diagram depicting a repository creation flow in accordance with an embodiment of the invention.

Referring to FIG. 3 a flow diagram 300 depicting a repository creation flow is provided in accordance with an example embodiment of the invention. In this flow the system creates a repository in a source code control which will have application source code along with base application DSC object which will call the master DSC object. Further, access control application service is invoked using remote procedure call (RPC) protocol such as gRPC protocol to build fast APIs.

Figure 4:
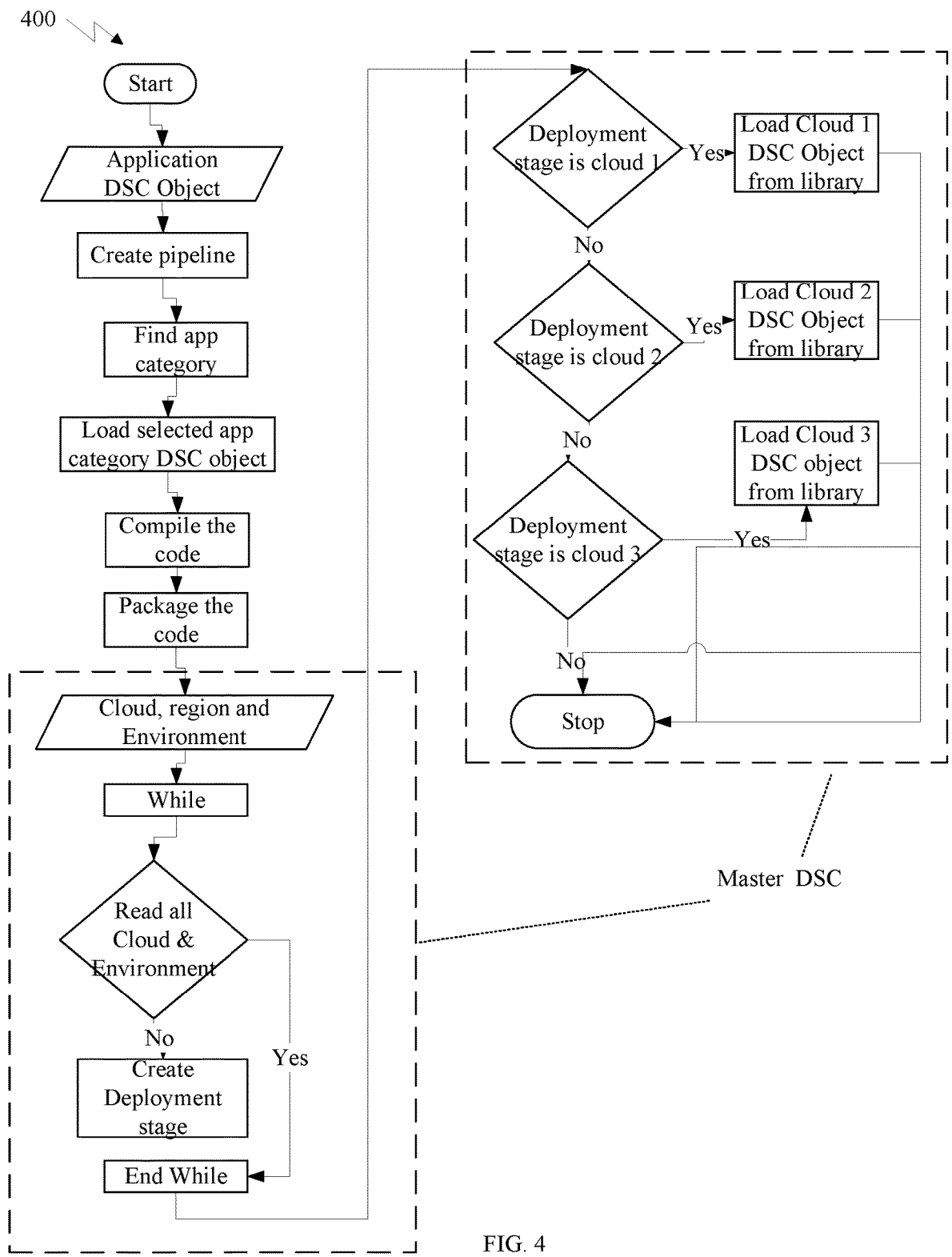
FIG. 4 is a flow diagram depicting a pipeline creation flow in accordance with an embodiment of the invention.

Referring to FIG. 4 a flow diagram 400 depicting a pipeline creation flow is provided in accordance with an example embodiment of the invention. The flow includes reading the application DSC object from the source control and fetching the application category from the parameter received as the input. Loading the application DSC object identified by the AI engine and executing the steps under each application category. The steps include checkout the code, compile the code, running unit test code, code quality check, packaging the code and publishing the package. Each cloud specific DSC object have cloud native commands to deploy the compiled artifacts. For eg, if the cloud is cloud 1 then the cloud 1 DSC object reference will be injected into the deployment pipeline.

Figure 5:
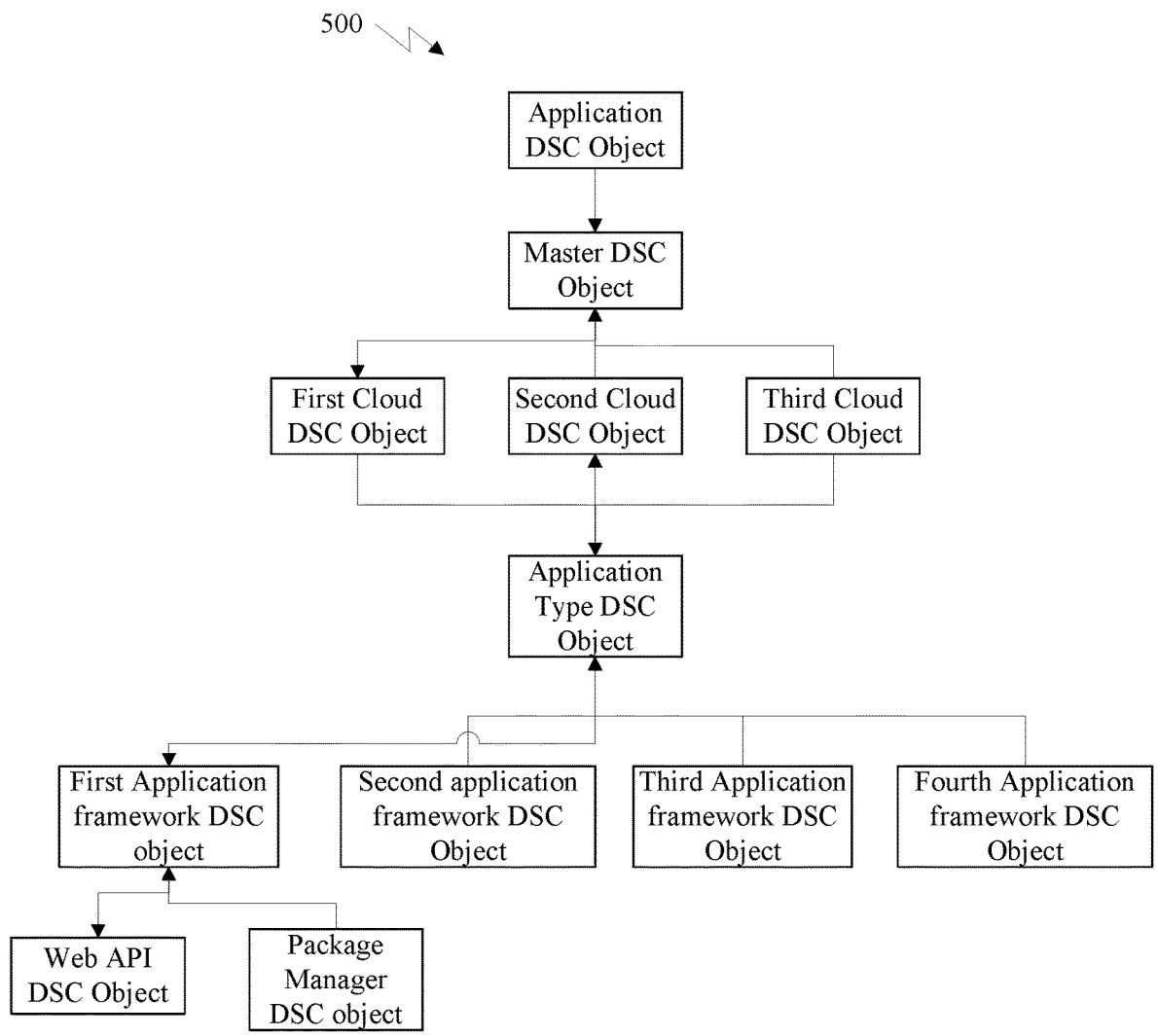
FIG. 5 is a layered block diagram of the deployment pipeline in accordance with an embodiment of the invention.

FIG. 5 is a layered block diagram of the deployment pipeline in accordance with an embodiment of the invention. Different set of DSC objects are created using system UI and AI service. The application DSC object is created as a file as part of an individual service. This DSC object calls the Master DSC object and passes necessary values. The master DSC object loops through the variables/parameters and then it calls appropriate cloud DSC object.

FIG. 6 is a user interface 600 showing multi-cloud environment deployment for an application in accordance with an embodiment of the invention. The interface 600 provides request ID, cloud details, programming language for the application to be deployed and the status of the deployment.

Figure 6A:
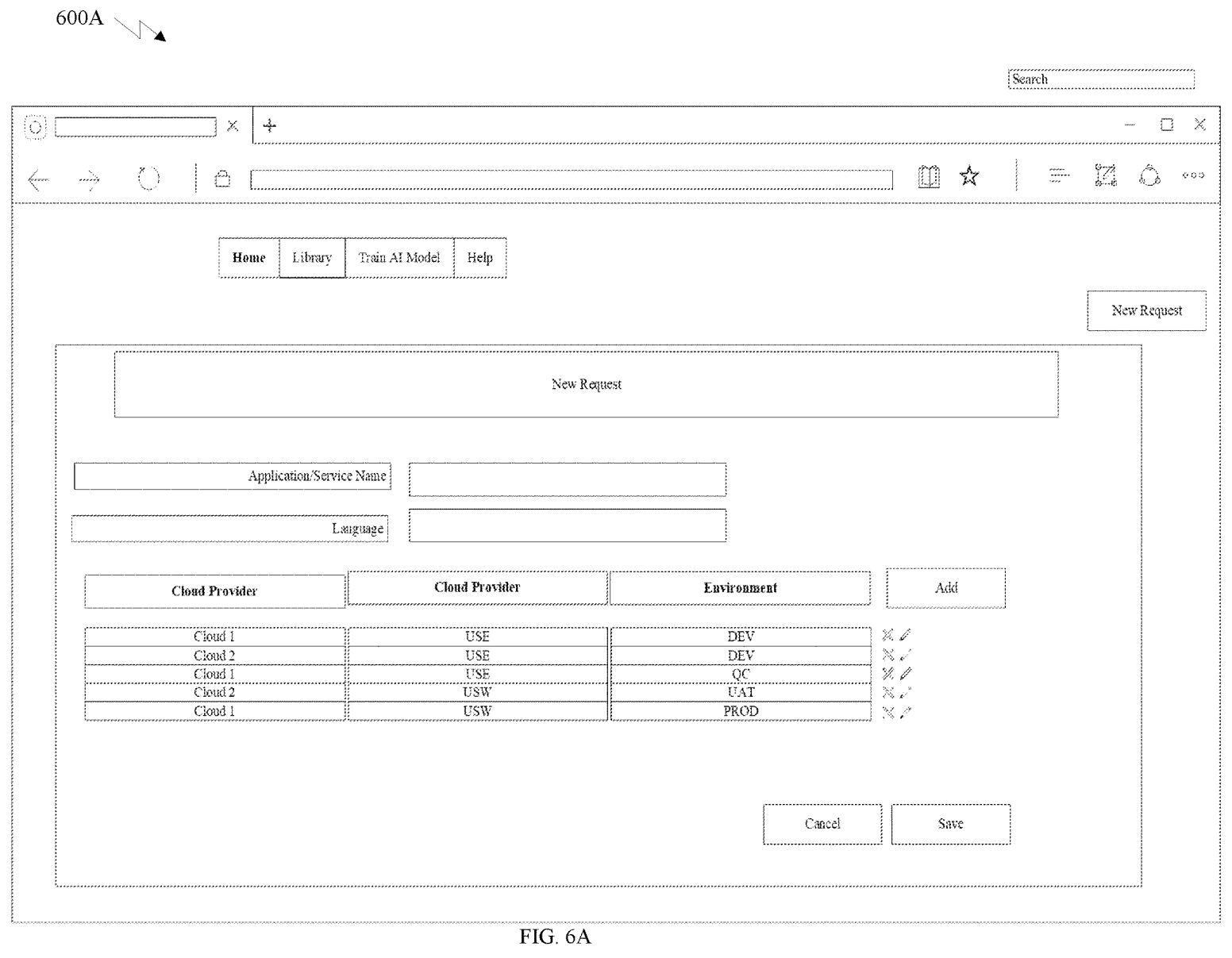

FIG. 6A is a user interface 600A showing a new request for deployment of an application in accordance with an embodiment of the invention. The interface 600A provides a cloud provider, region of implementation and environment details for application deployment.

Figure 7:
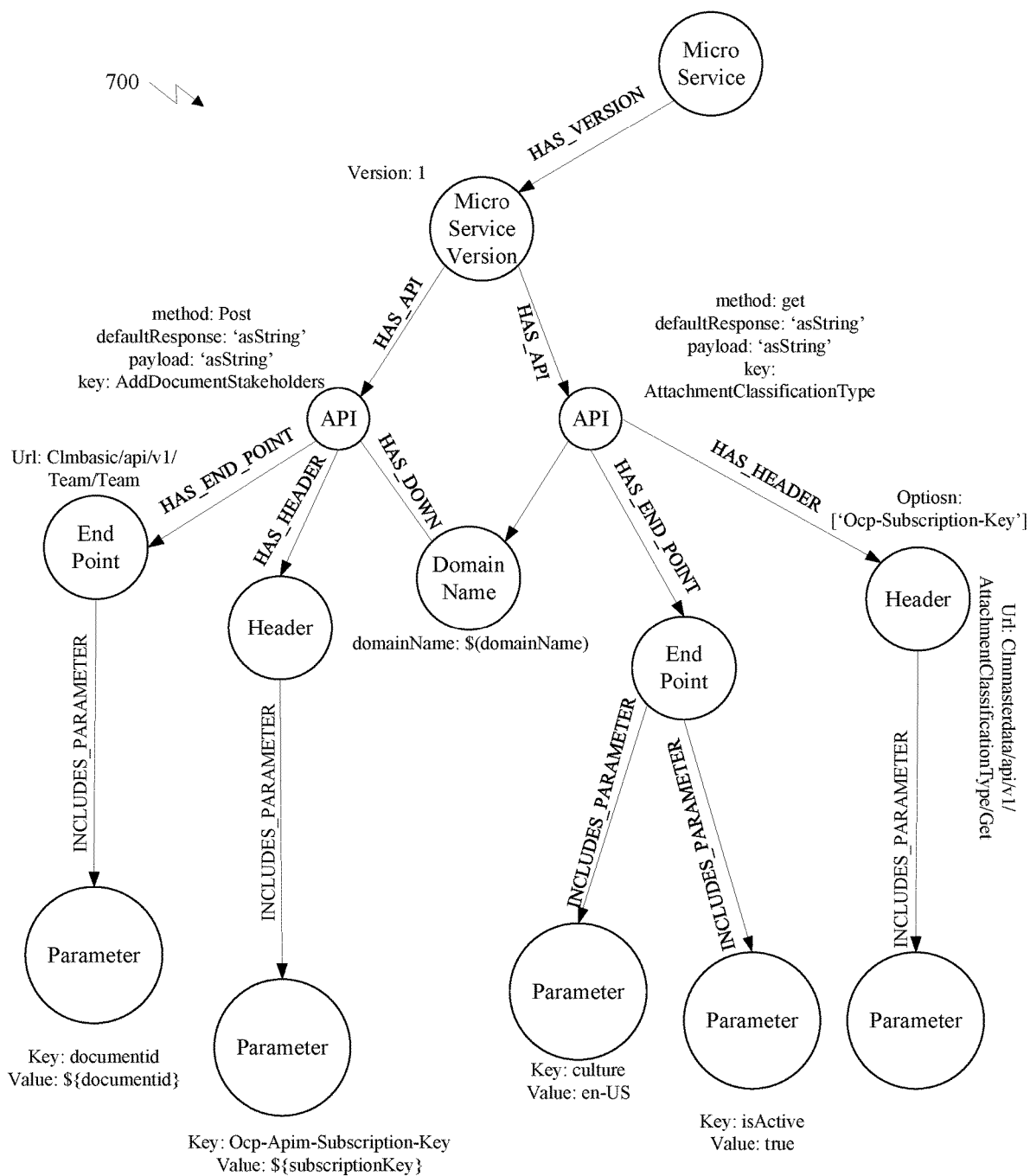
FIG. 7 is codeless platform architecture data network with nodes and relations in accordance with an embodiment of the invention.

FIG. 7 is a codeless platform architecture data network 700 with nodes and relations in accordance with an embodiment of the invention. The network defines a microservice and includes API. It includes properties of API defined as default values (as part of the node or relations). The network graph shows nodes including End point, domain name, Header, one or more parameter etc. and defines relationship and dependencies.

Figure 7A:
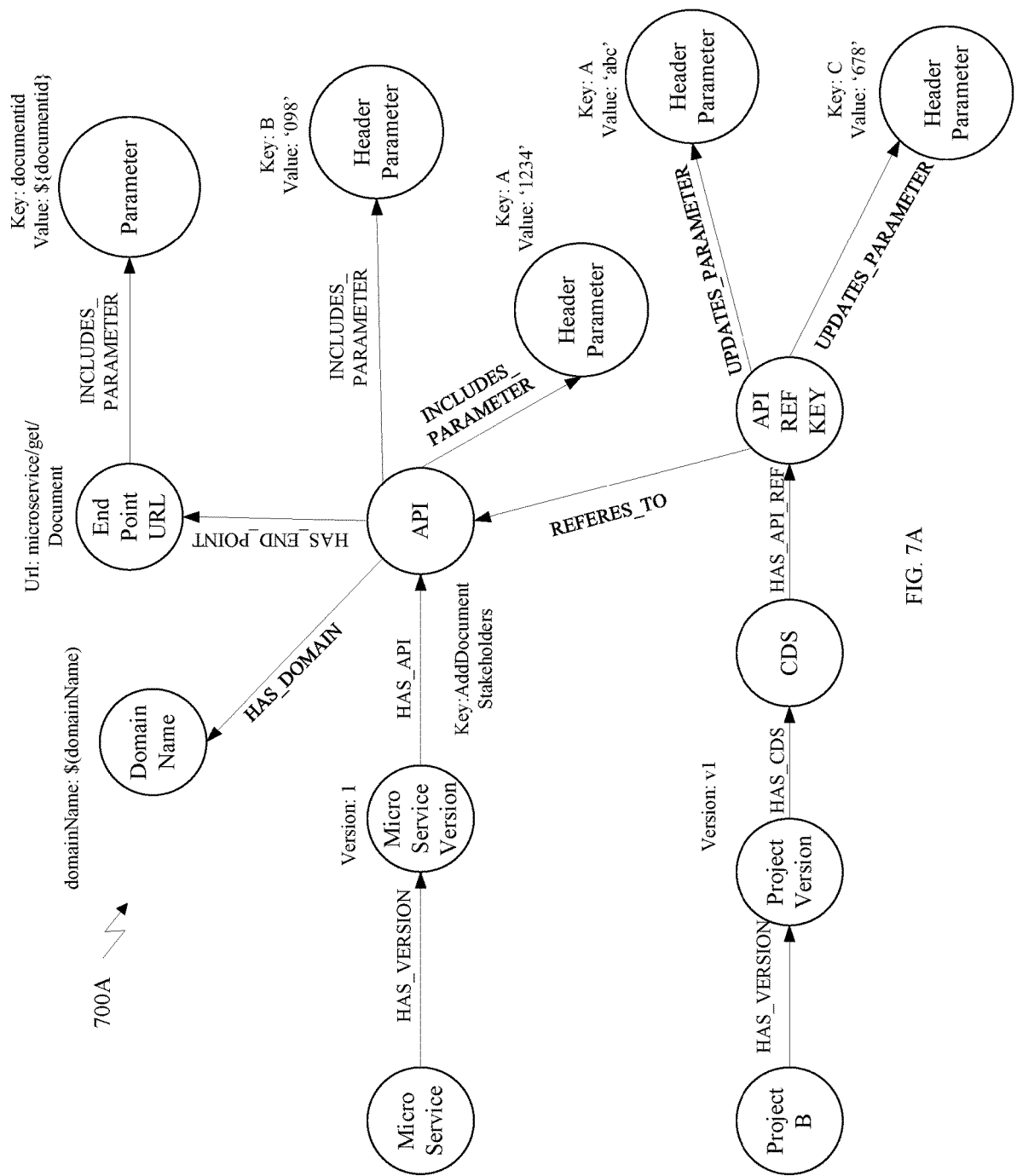
FIG. 7A is a network with real time updated API parameters and configurations required to be implemented for an application to be deployed through the pipeline in accordance with an embodiment of the invention.

FIG. 7A is a network 700A with real time updated API parameters and configurations required to be implemented for an application to be deployed through the pipeline in accordance with an embodiment of the invention. If API included in the CDS (configurable data source) are interdependent on each other for input, then the 'API REF KEY' nodes are modeled to represent the dependence tree with the leaf nodes being the references to the API being fired first. This information is stored on the project/application side of the network and not on the microservice side of the network to smoothly handle provision of external API or updates to the internal ones. The network shows graph nodes including APIRef Key, micro service version, project/application version, domain name, End point Url, one or more parameters etc.

Figure 7B:
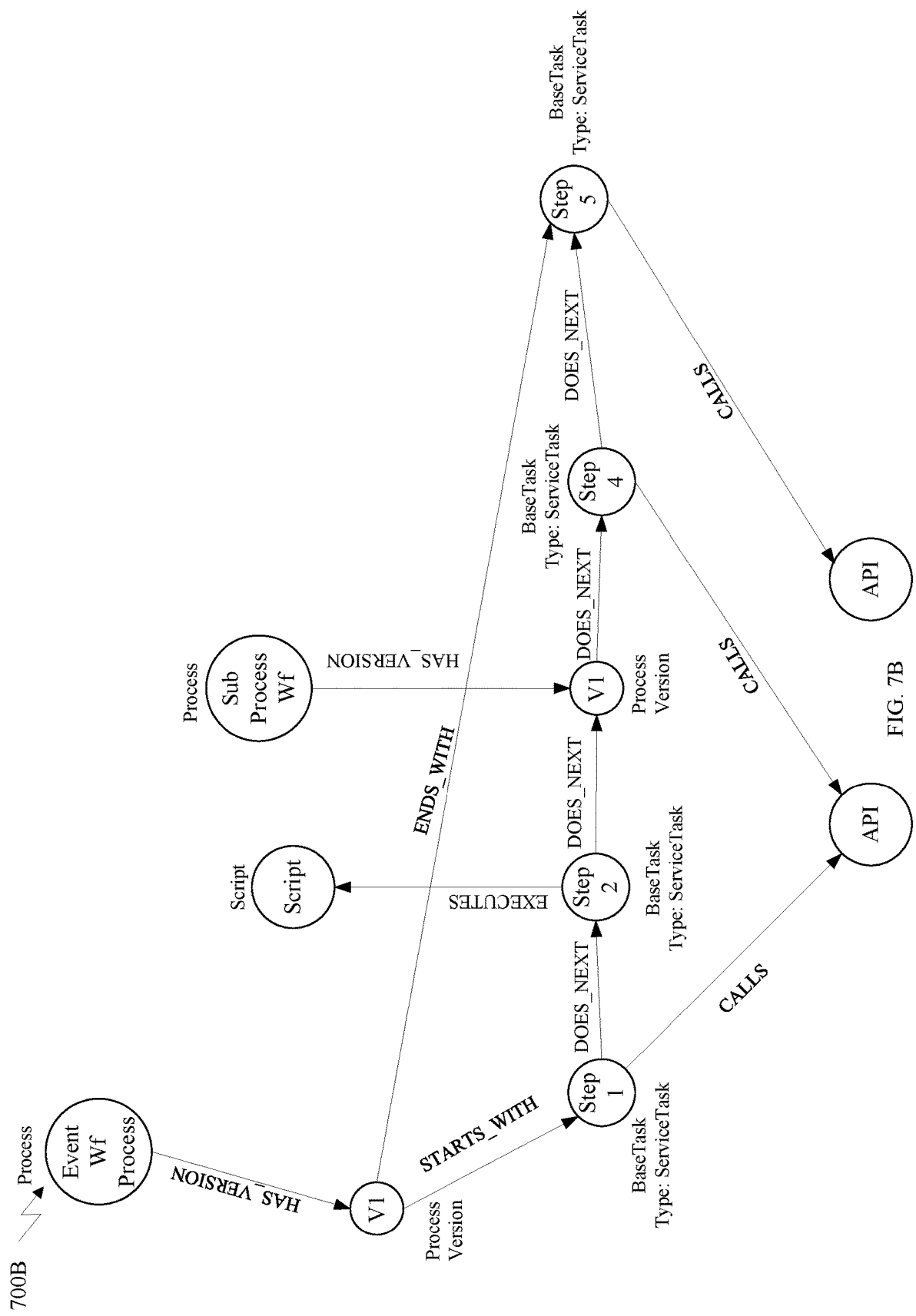
FIG. 7B provides a flow of deployment process, dependencies between various parts of the process and code execution pipeline in accordance with an embodiment of the invention.

FIG. 7B provides a network 700B flow of deployment process, dependencies between various parts of the process and code execution pipeline in accordance with an embodiment of the invention. The graph model-based network 700B enables process modelling notation where the process defines a sequence flow of tasks. It creates processes with two sections as fixed and flexible. Only the flexible section of the process can be modified while creating a custom process for a project. The network aims to keep track of Project level changes to the flexible tasks of the process and External dependencies (i.e. APIs consumed). Further, the model enables adapting a custom process as a generic one into the common repository. The network shows nodes including Event workflow (Wf) process node, scripts, Sub process Workflow (Wf) and multiple step nodes for executing the task. Further the nodes include multiple process version (PV) as V1 etc.

Figure 7C:
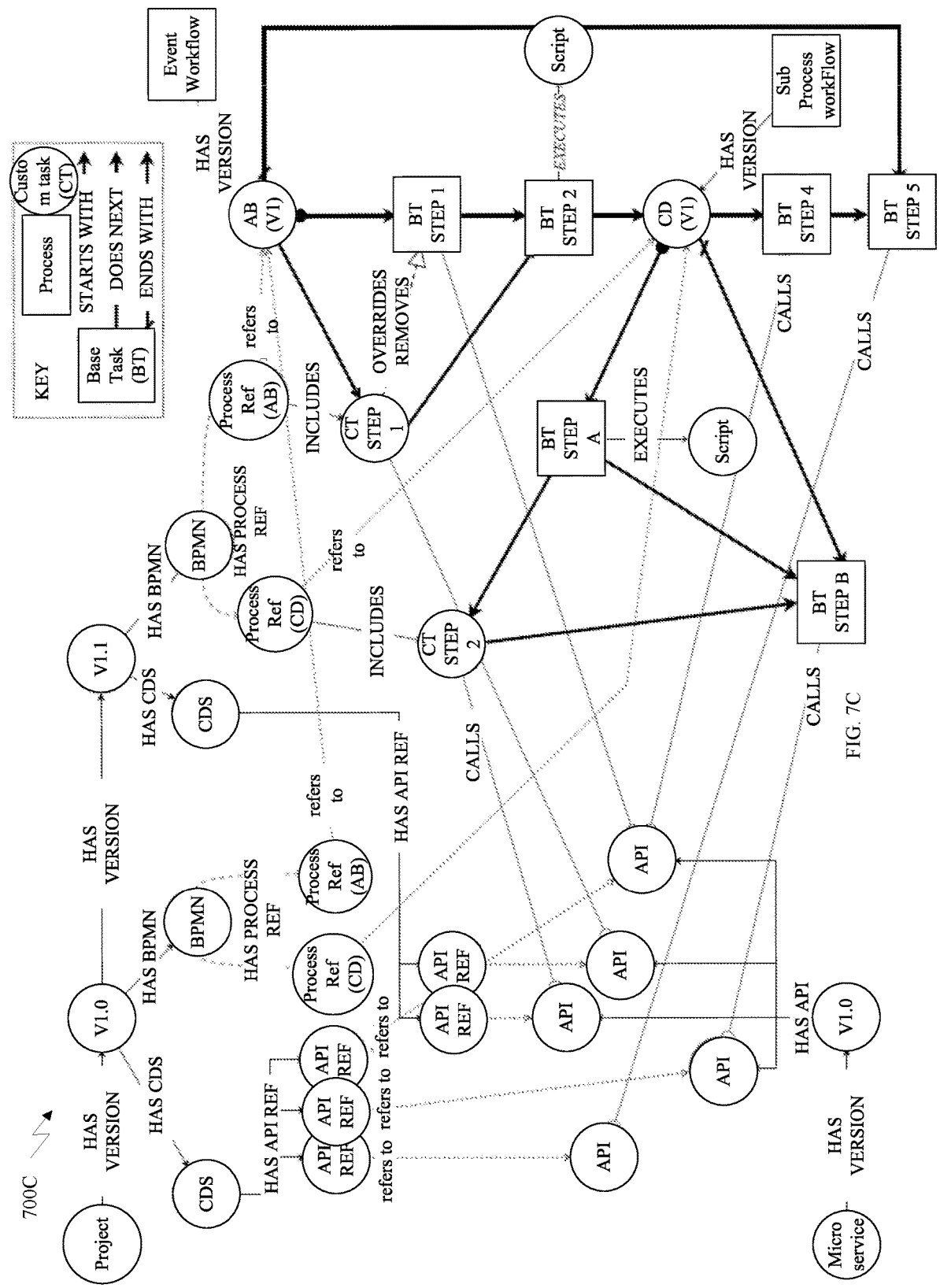
FIG. 7C provides a network structure of deployment pipeline for an application, interdependencies, and versioning in accordance with an embodiment of the invention.

FIG. 7C provides a network structure 700C of deployment pipeline for an application, interdependencies, and versioning in accordance with an embodiment of the invention. Each step for deployment process orchestrates the flow and identifies dependencies. The network shows plurality of nodes including BPMN (Business process mode and notation) or organizational application process mode and notation, Microservices, Base task (BT), custom task (CT) node, process reference (PR) nodes, etc.

Figure 7D:
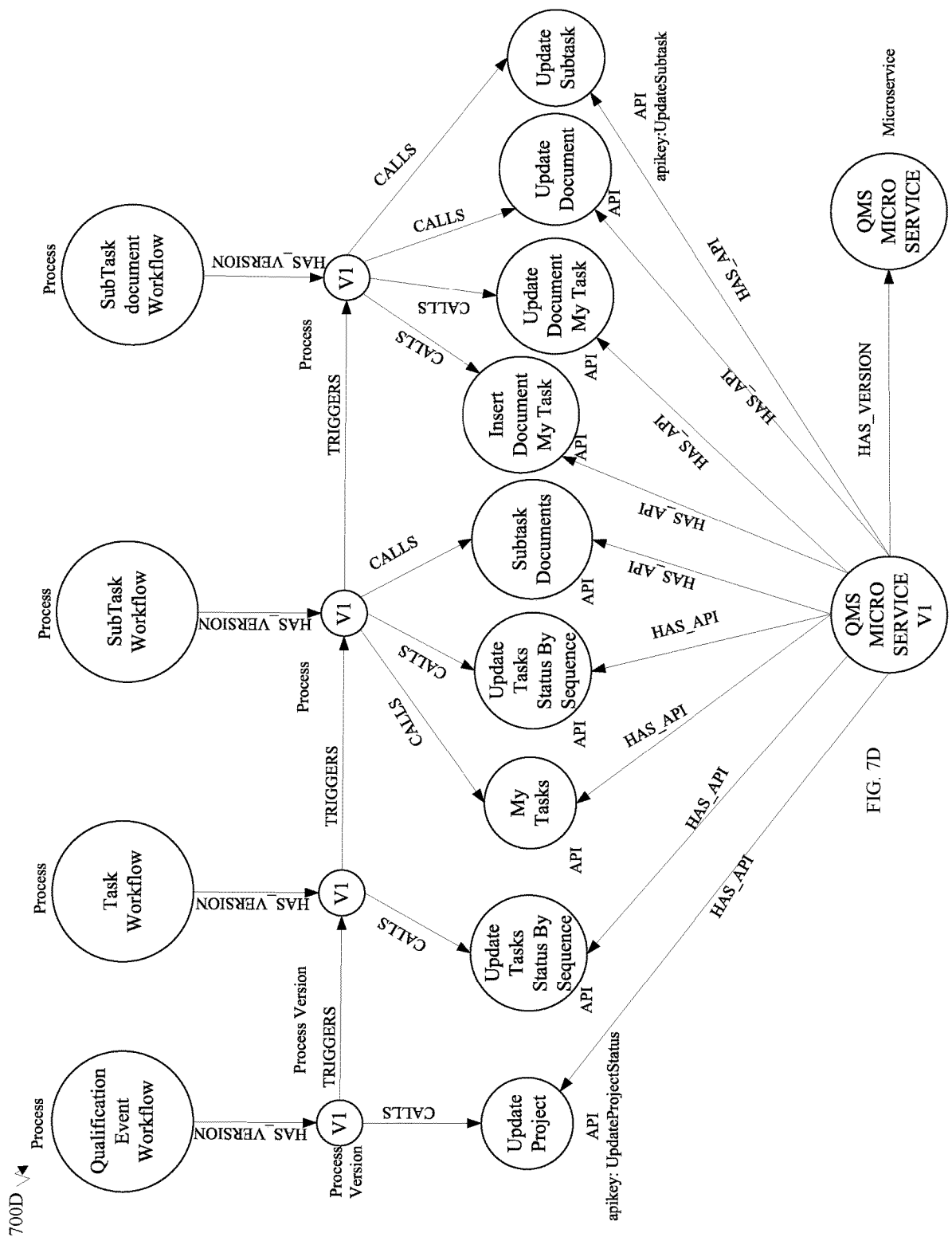
FIG. 7D provides a network model for process and version association, inter process and inter version dependencies in accordance with an embodiment of the invention.

FIG. 7D provides a network model 700D for process and version association, inter process and inter version dependencies in accordance with an embodiment of the invention. The process versions include a reference to the API endpoints. The reference is used in the API call is stored as part of the API reference of CDS (Configurable data source). The network model includes plurality of nodes shown as Quality management service (QMS) micro service version V1, connected to Update project (UP) node, update task status by sequence (UTSS), My tasks (MT), Update sub task status by sequence (USTSS), Update document (UD), Insert document my task (IDMT), Update document my task (UDMT), Update subtask (UST), sub task document, workflow etc. with various Calls, triggers to connect with each other for executing a task.

Figure 7E:
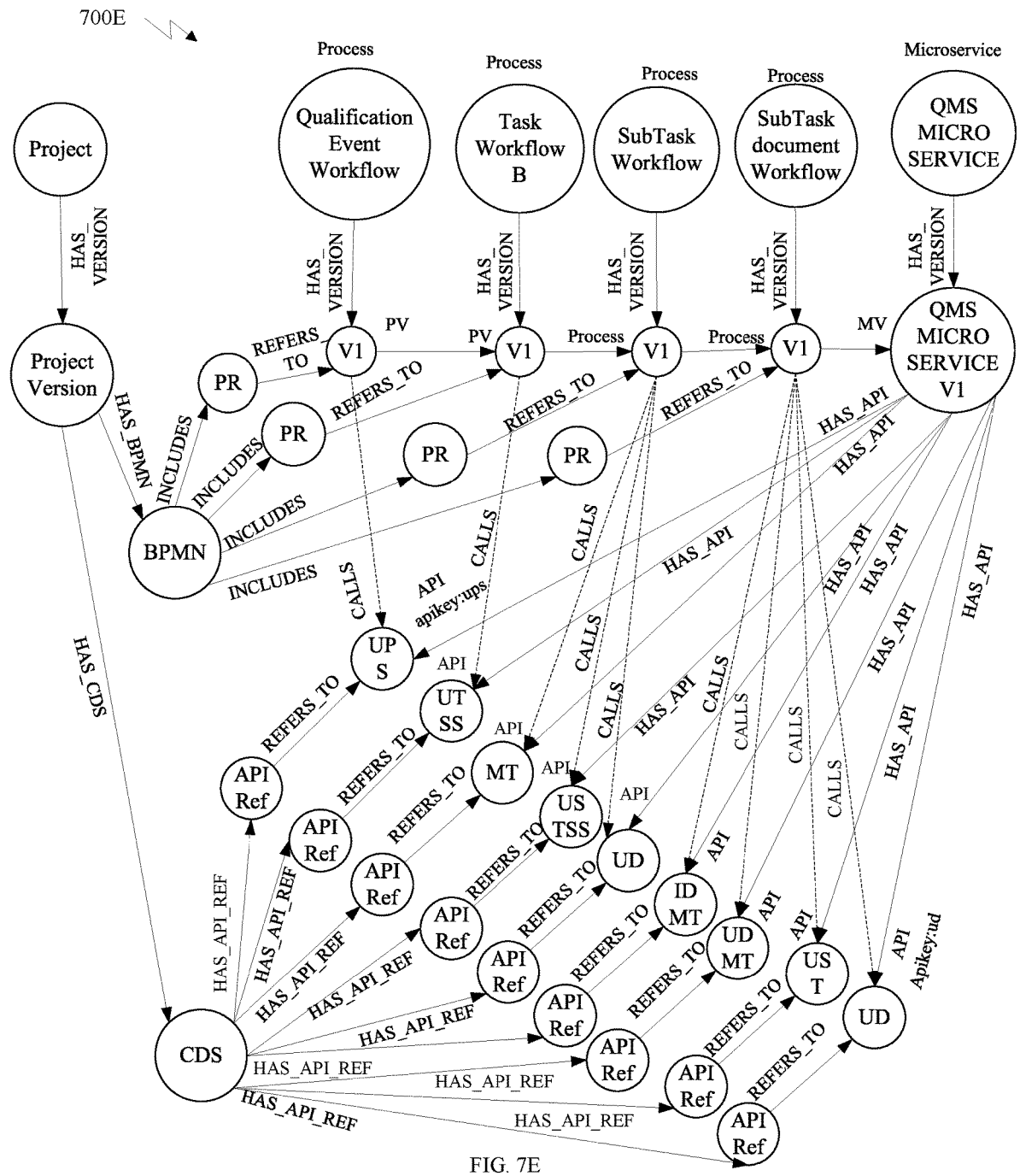
FIG. 7E provides a network model of deployment structure and association with CDS in accordance with an embodiment of the invention.

FIG. 7E provides a network model 700E of deployment structure and association with CDS in accordance with an embodiment of the invention. CDS stores versions of APIs and references. The network model 700E includes multiple nodes including Update project status (UPS), update task status by sequence (UTSS), My tasks (MT), Update sub task status by sequence (USTSS), Update document (UD), Insert document my task (IDMT), Update document my task (UDMT), Update subtask (UST), etc. connecting to API ref nodes. Further, the network shows Process version (PV), Microservice version (MV), project reference (PR) etc.

Figure 7F:
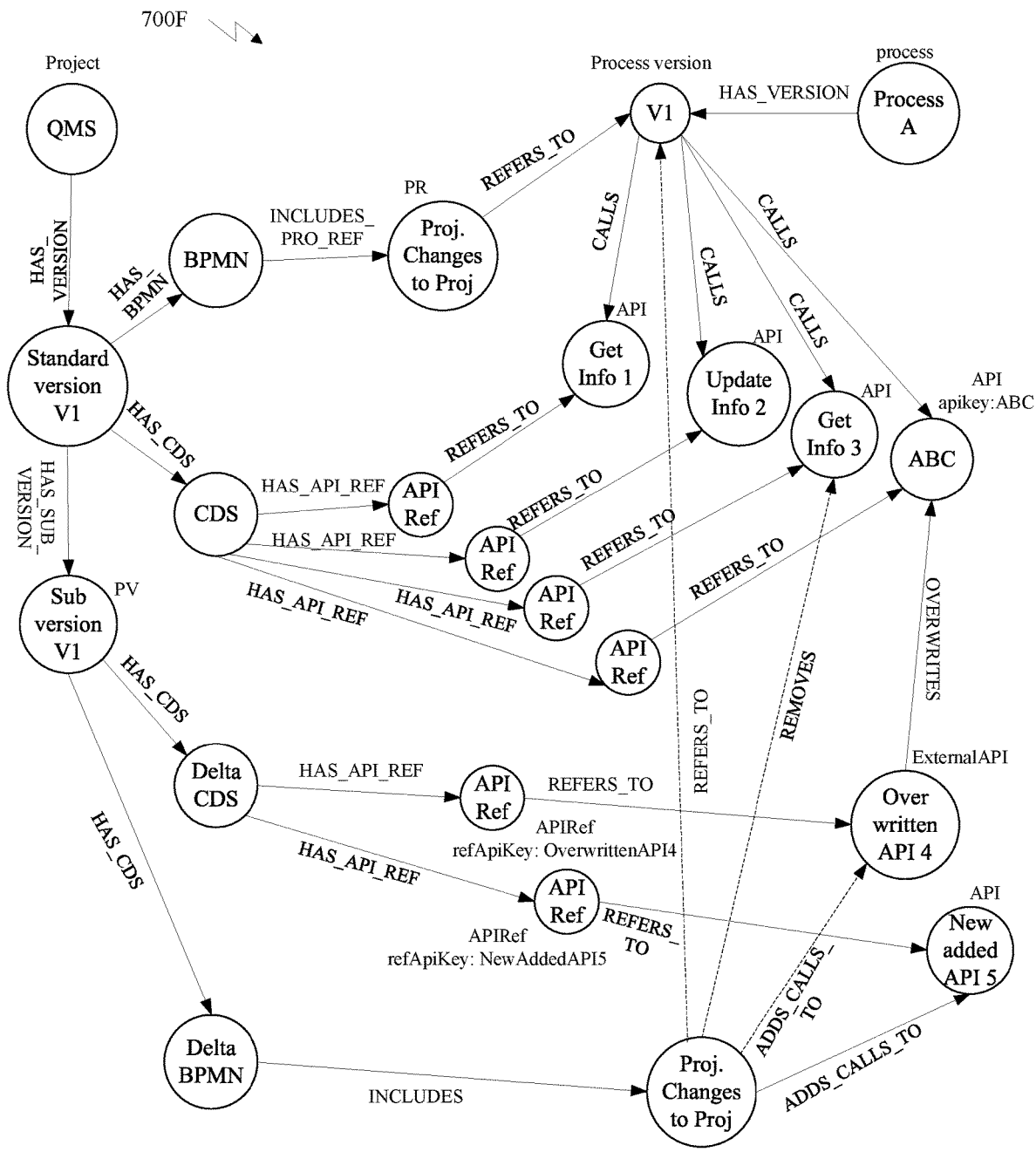
FIG. 7F provides a network model of CDS dependencies on multiple versions of API metadata in accordance with an embodiment of the invention.

FIG. 7F provides a network model 700F of CDS dependencies on multiple versions of API metadata in accordance with an embodiment of the invention. The network models include a plurality of nodes with relationships and dependencies. The nodes including Sub Version V1, standard Version V1, CDS, Delta CDS, Overwritten API 4, New added API, Project and changes to Project node, process nodes, etc.

Figure 8:
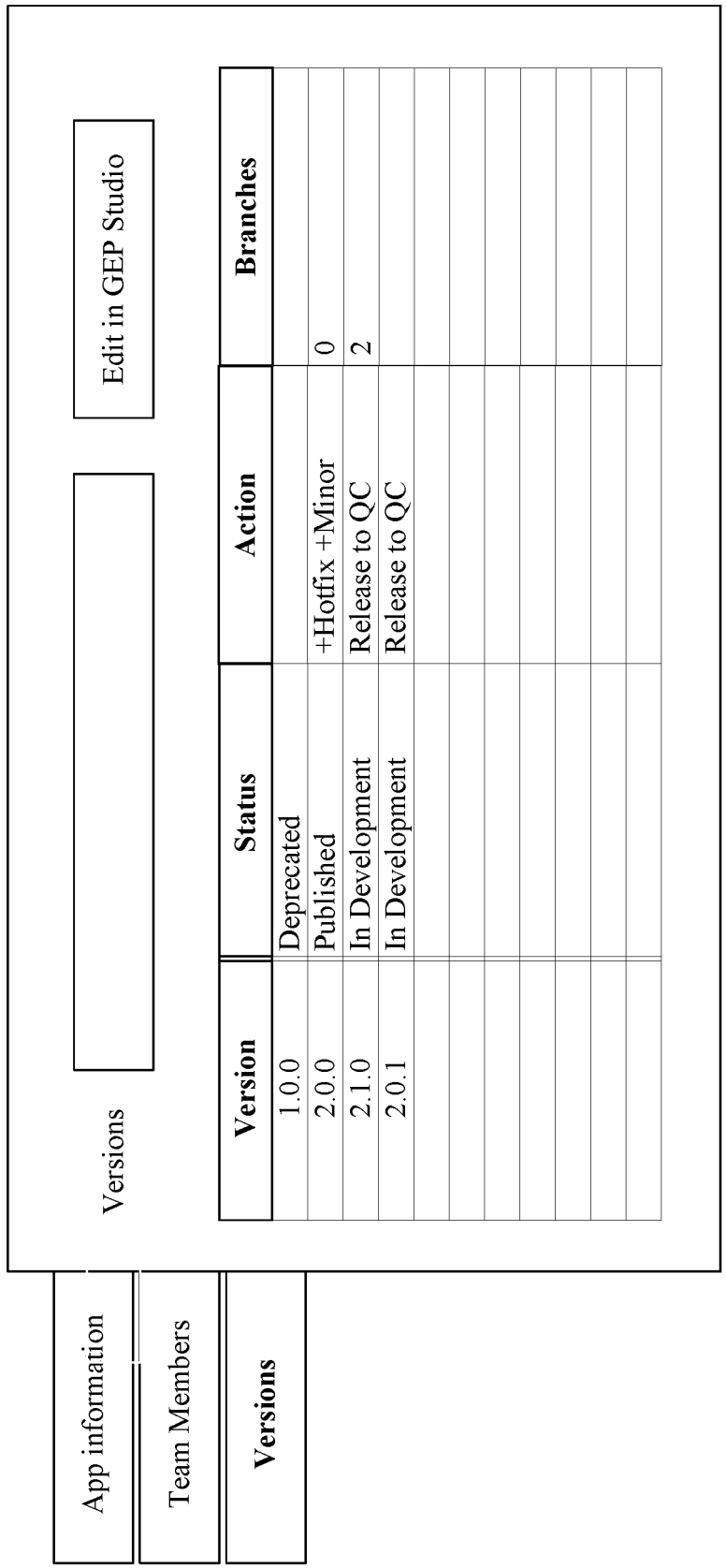
FIG. 8 is an interface providing version details about the application deployment pipeline in accordance with an embodiment of the invention.

FIG. 8 is an interface 800 providing version details about the application deployment pipeline in accordance with an embodiment of the invention.

Figure 8A:
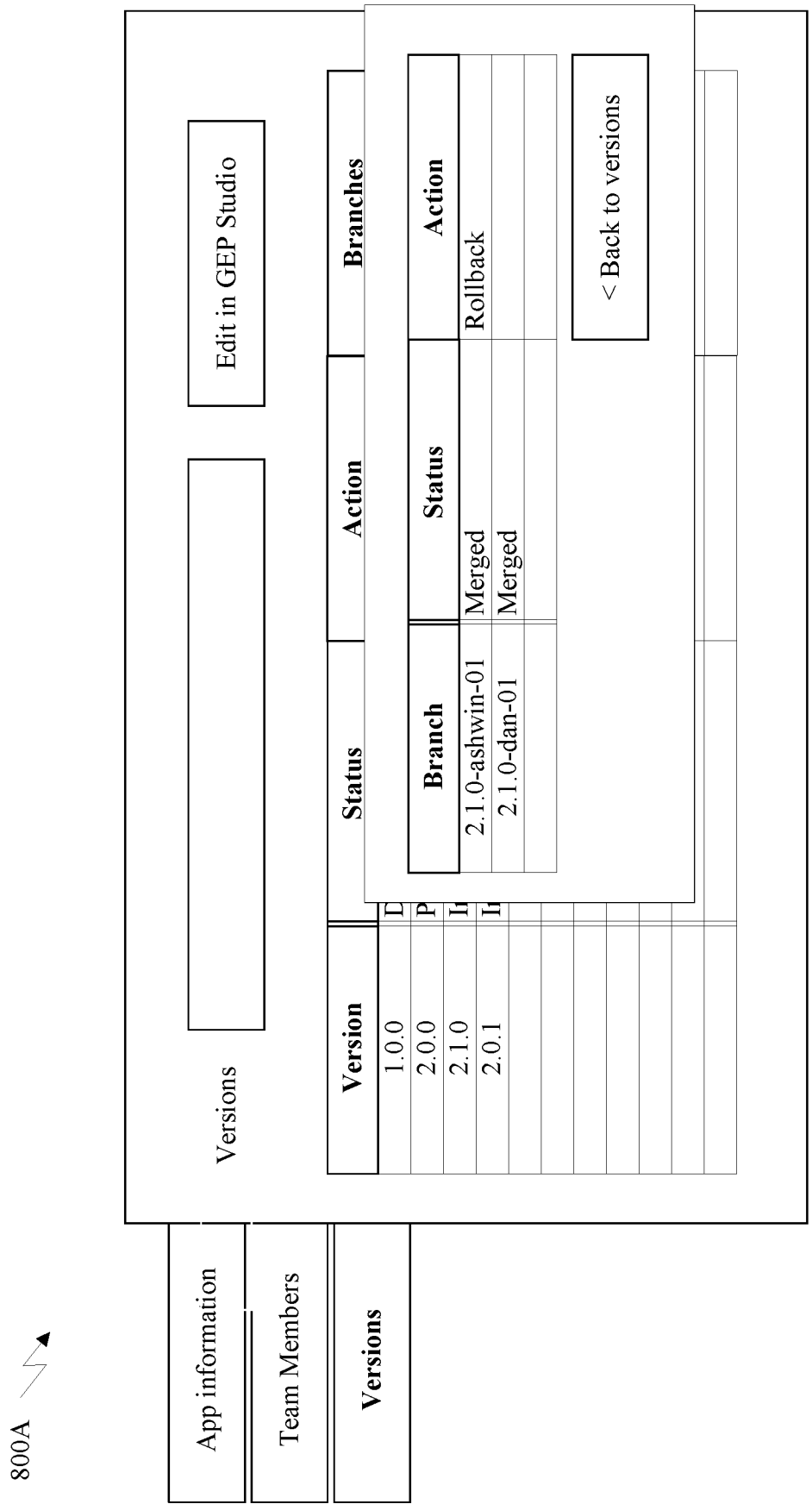
FIG. 8A is an interface providing version details and branch about the application deployment pipeline in accordance with an embodiment of the invention.

FIG. 8A is an interface 800A providing version details and branch about the application deployment pipeline in accordance with an embodiment of the invention.

Figure 8B:
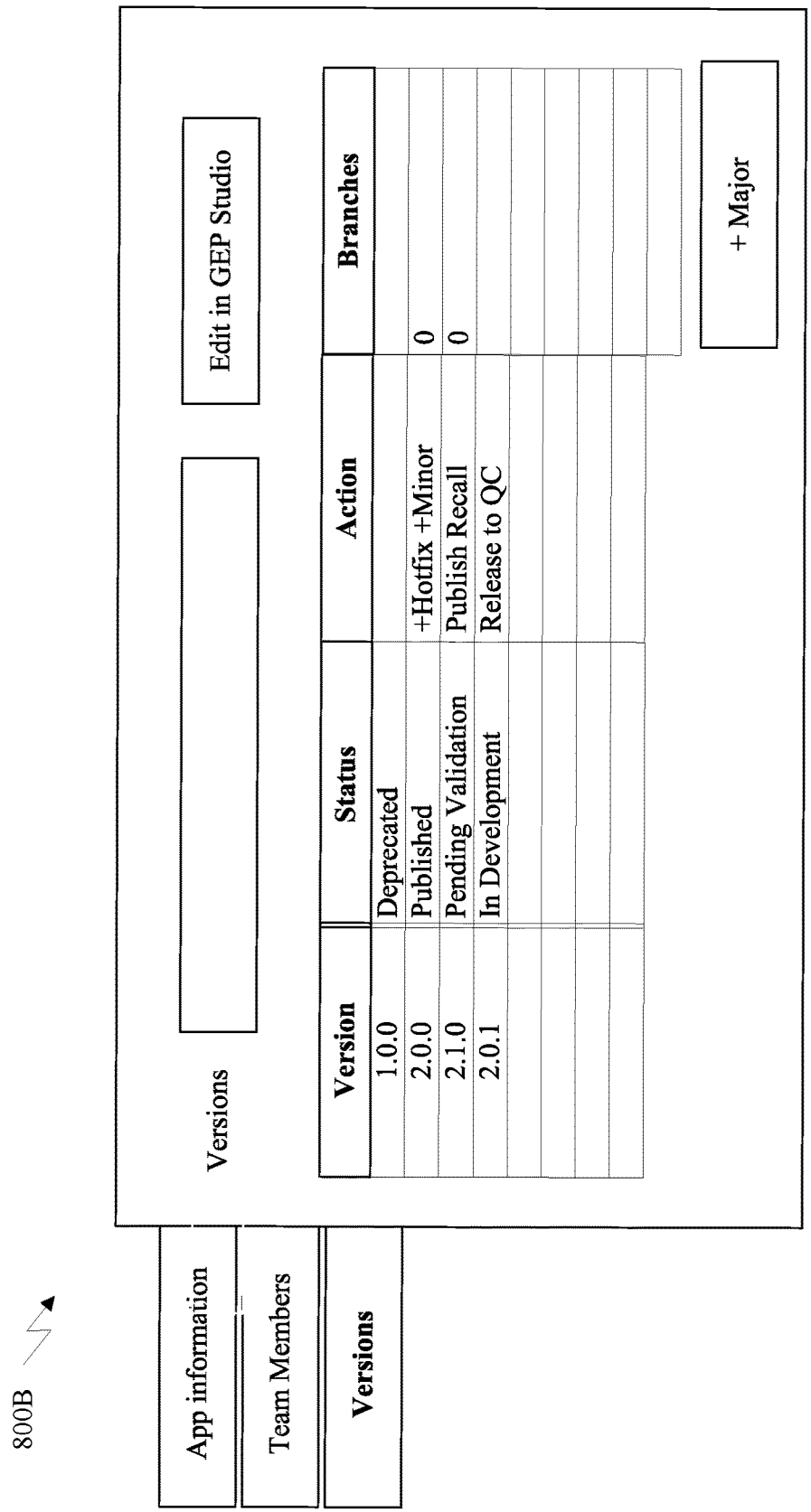
FIG. 8B is an interface providing version details and publishing changes in the application deployment pipeline in accordance with an embodiment of the invention.

FIG. 8B is an interface 800A providing version details and publishing changes in the application deployment pipeline in accordance with an embodiment of the invention.

Figure 9:
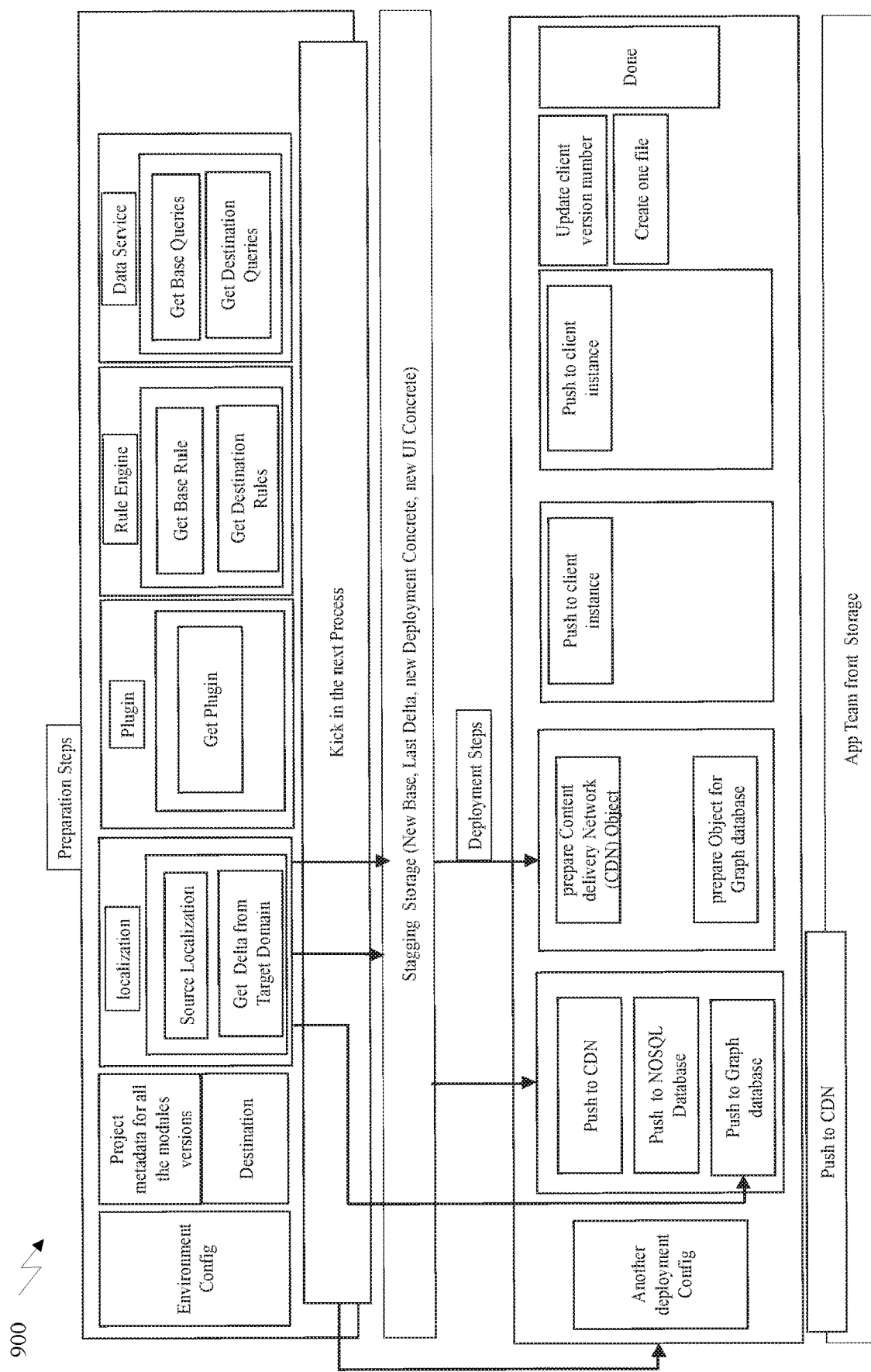
FIG. 9 is a block diagram of preparation steps of deployment pipeline connectivity to various dependent blocks in accordance with an embodiment of the invention.

FIG. 9 is a block diagram 900 of preparation steps of deployment pipeline connectivity to various dependent blocks in accordance with an embodiment of the invention. The block diagram depicts one or more application and pipeline elements including but not limited to plugin, rule engine, data service elements, environment configuration elements etc.

In an embodiment, system of the present invention utilizes artificial intelligence to orchestrate deployment of the pipeline by determining one or more dependencies of the one or more application and one or more pipeline elements. In the codeless platform, the configurations are dynamic and impacts the end-to-end application flow. E.g. Version of the API attached to the Get and Save method on the button click. In codeless platform Submit Button is displayed based on the state of the document. API associated to button click event can changed based on the version on the API deployed. In this example UI event is dependent on the API version deployment. DSC configuration has to be updated for Button Meta data. Metadata available on the UI is also dynamic in nature.

In an exemplary embodiment, the system may enable cognitive computing to improve interaction between a user and the system deploying one or more application(s) pipeline. The interface provides insight into multi-cloud environment for the one or more application to be deployed.

In an advantageous aspect, the application deployment pipeline system and method for one or more applications structured based on codeless platform enable Sourcing, Procurement and Supply Chain to create applications with industry seed projects having set of rules and workflow, process flow for various industries like Oil & Gas, FMCG, Finance etc.

The present invention uses Artificial intelligence, orchestration of pipeline deployment and layered platform architecture where the entire application operational logic including metadata elements of the one or more application is transformed and deployed with the application through complex logic. The application structure flow is translated in the engine for deployment pipeline. It is very helpful to manage multitenant applications. Simulators also help to test the application flow. The one or more application deployed through the system provides building highly scalable services. The system provides productivity gain and accelerates implementation cycle.

In an exemplary embodiment, the present invention may be an application pipeline deployment system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device i.e. it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

The invention claimed is:

1. A system for managing and deploying one or more applications in a multi-cloud environment, the system comprises:
one or more processors; and
one or more memory devices including instructions that are executable by the one or more processors for causing the one or more processors to
extract one or more data attributes associated with at least one input data received at a server through an electronic user interface;
fetch at least one data serialization and configuration (DSC) object from a database based on the extracted data attributes wherein the one or more processors coupled to an AI engine processes the extracted data attributes for identifying the DSC object to be fetched,
and
identify and deploy one or more application deployment pipelines based on the fetched DSC object to structure the one or more applications.

2. The system of claim 1, wherein the one or more processors are configured to create data serialization and configuration (DSC) object by:
executing a matching operation for the one or more data attributes of the received input data to determine existence of the one or more data attributes related DSC object in the database; and
in response to determination of the DSC object, fetching the object from the database, else creating the at least one DSC object based on the received input data, a master DSC object and AI processing of one or more DSC data libraries.

3. The system of claim 2, wherein the one or more processors are configured to:
create a platform data/code structure based on the one or more data attributes associated with the received one or more input data and at least one platform code structure template;
transfer by the at least one data serialization and configuration (DSC) object, one or more values associated with the received input data to a master data serialization and configuration (MDSC) object;
create the at least one data serialization and configuration (DSC) object based on one or more input data received at the interface, the master data serialization and configuration (MDSC) object and the one or more data serialization and configuration (DSC) data libraries, wherein the AI engine coupled to the processor identifies one or more data elements from the one or more DSC libraries and injects the data elements in a master template of the (MDSC) for creating the DSC object; and inject the platform data structure and the at least one data serialization and configuration (DSC) object for identifying the pipeline to structure the one or more applications.

4. The system of claim 3, wherein the at least one data serialization and configuration (DSC) object is an application DSC object or a cloud DSC object.

5. The system of claim 4, wherein the one or more applications are developed on a codeless platform architecture based on one or more configurable components thereby requiring the AI engine to process continuously restructured DSC data library elements of application DSC object and associated deployment pipeline elements for deployment of the pipelines.

6. The system of claim 5, wherein the AI engine is configured to orchestrate deployment of the pipeline by determining one or more dependencies of the one or more applications and one or more pipeline elements.

7. The system of claim 6, wherein the one or more dependencies include changes in metadata of the one or more applications developed on the codeless platform architecture requiring changes in the one or more pipeline elements for deploying the one or more applications with the changed metadata.

8. The system of claim 7, wherein the one or more dependencies and the one or more data elements from the one or more DSC libraries are determined by:

ensemble of recursive data space partitioning wherein data points falling in a same data node after the data space partitioning are selected, the ensemble enables selection of data points separated into different nodes during data space expansion as the data points separated in one data space meets in another data space.

9. The system of claim 8, wherein a clustering data model developed based on a spectral clustering and an ensemble clustering enables processing of the one or more dependencies and the one or more data element from the one or more DSC libraries.

10. The system of claim 9, wherein the processor coupled to the AI engine is configured to identify one or more data models for processing the received input to determine requirement for creation of the data serialization and configuration (DSC) object.

11. The system of claim 10, wherein the one or more processors is configured to execute a data extraction process for extracting one or more data attributes of the at least one received input by:

identifying a type of input data; and sending the input data to at least one data recognition training model for identification of the one or more data attributes wherein the data recognition training model processes the input data based on prediction analysis by a bot for obtaining the data attribute with a confidence score.

12. The system of claim 11, wherein the one or more processors are configured to enable creation of the one or more data models by:

receiving, cleansing and normalizing a historical dataset;
dividing the normalized dataset into training dataset and testing dataset;

generating the one or more data models based on the training dataset and the testing dataset;

generating a prediction dataset for the testing dataset using the training data set through the one or more data models;

providing the prediction dataset as input to a neural network and testing data as output to identify one or more data attribute weights for determining accuracy and confidence score of the prediction dataset; and in response to determination of accuracy and confidence score to be above a threshold value, storing the dataset in a historical database.

13. The system of claim 12, wherein the historical database includes programming language data, versioning data, application data, cloud data, and deployment pipeline data elements.

14. The system of claim 13, wherein the AI engine processes one or more data elements of the historical database to recommend one or more DSC data library elements for structuring of the DSC libraries and creating the at least one DSC object.

15. The system of claim 14, wherein the one or more processors are configured to generate by a bot one or more data scripts created for identifying and deploying the one or more deployment pipelines by utilizing a library of functions stored on a functional database, wherein the data scripts are backend scripts created by the hot based on the one or more pipeline data elements, at least one received input and AI processing for enabling automation of the DSC object creation, identification and deployment of the one or more deployment pipelines.

16. The system of claim 15, wherein the one or more data attributes include cloud type, region, and environment, application type, database type, application security compliance and regional requirement, customer hosted region requirement and line of operation.

17. The system of claim 16, wherein the electronic user interface includes:

one or more graphical elements depicting one or more data points including one or more deployment application data and one or more pipeline element data for each of the one or more deployment application data wherein the one or more data points generate a deployment pipeline projection on the user interface through the graphical elements; and one or more input data elements of the one or more graphical elements configured to receive the at least one input data associated with the one or more data points in the deployment pipeline projection.

18. The system of claim 17, wherein a first data point of the one or more data points is connected to a second data point of the one or more data points on the interface by one or more connector elements of the one or more graphical elements to generate the projection through the one or more graphical elements based on processing of the historical dataset by the processor coupled to the Artificial intelligence (AI) engine.

19. A method for managing and deploying one or more applications in a multi-cloud environment, the method comprising the steps of:

receiving at least one input data at a server through an electronic user interface;

extracting one or more data attributes associated with the at least one input data;

fetching at least one data serialization and configuration (DSC) object from a database based on the extracted data attributes, wherein a processor coupled to an AI engine processes the extracted data attributes for identifying the DSC object to be fetched; and identifying and deploying one or more application deployment pipelines based on the fetched DSC object to structure the one or more applications.

20. The method of claim 19 wherein the step of identifying the at least one data serialization and configuration (DSC) object includes:

executing a matching operation for the one or more data attributes of the received input data to determine existence of the one or more data attributes related DSC object in the database; and in response to determination of the DSC object, fetching the object from the database, else creating the at least one DSC object based on the received input data, a master DSC object and AI processing of one or more DSC data libraries.

21. The method of claim 20, further comprises the step of:

creating a platform data/code structure based on the one or more data attributes associated with the received one or more input data and at least one platform code structure template;

transferring by the at least one data serialization and configuration (DSC) object, one or more values associated with the received input data to a master data serialization and configuration (MDSC) object;

creating the at least one data serialization and configuration (DSC) object based on one or more input data received at the interface, the master data serialization and configuration (MDSC) object and the one or more data serialization and configuration (DSC) data libraries wherein the AI engine coupled to the processor identifies one or more data elements from the one or more DSC libraries and injects the data elements in a master template of the (MDSC) for creating the DSC object; and injecting the platform data structure and the at least one data serialization and configuration (DSC) object for identifying the application deployment pipeline to structure the one or more applications.

22. The method of claim 21, wherein the at least one data serialization and configuration (DSC) object is an application DSC object or a cloud DSC object.

23. The method of claim 22, wherein the one or more applications are developed on a codeless platform architecture based on one or more configurable components thereby requiring the AI engine to process continuously restructured DSC data library elements of application DSC object and associated deployment pipeline elements for deployment of the pipelines.

24. The method of claim 23, wherein the AI engine is configured to orchestrate deployment of the pipeline by determining one or more dependencies of the one or more applications and one or more pipeline elements.

25. The method of claim 24, wherein the one or more dependencies include changes in metadata of the one or more applications developed on the codeless platform architecture requiring changes in the one or more pipeline elements for deploying the one or more applications with the changed metadata.

26. The method of claim 25, wherein the one or more dependencies and the one or more data elements from the one or more DSC libraries are determined by:

ensemble of recursive data space partitioning wherein data points falling in a same data node after the data space partitioning are selected, the ensemble enables selection of data points separated into different nodes during data space expansion as the data points separated in one data space meets in another data space.

27. The method of claim 25, wherein the AI engine splits the nodes into child nodes along a randomly generated direction wherein a projection of the data points in the node onto the random direction is given by:

$$\frac{d \cdot y \, (d)}{|d|^2}$$

where, "d" is the random direction, y is a data point;

projection coefficient of points in node "B" along direction "d" are $B_d = \{d \cdot y : y \varepsilon B\}$ if projection coefficient of the splitting point is "k" then, a child node $B_1$ is provided as:

$B_1 = \{y \varepsilon B : d \cdot y < k\}$ and a child node $B_2$ is given by rest of the points.

28. The method of claim 26, wherein a clustering data model developed based on a spectral clustering and an ensemble clustering enables processing fo the one or more dependencies and the one or more data elements from the one or more DSC libraries.

29. The method of claim 28, wherein the processor coupled to the AI engine is configured to identify one or more data models for processing the received input to determine requirement for creation of the data serialization and configuration (DSC) object.

30. The method of claim 28, further comprises:

accessing one or more application objects of a blockchain network through the deployment pipeline elements wherein one or more branches of the blockchain network is configured to connect the one or more application objects to one or more cloud environment.

31. A non-transitory computer program product to manage and deploy one or more applications in a multi-cloud environment, the computer program product comprising a non-transitory computer readable storage medium having instructions embodied therewith, the instructions when executed by one or more processors causes the one or more processors to:

receive at least one input data at a server through an electronic user interface;

extract one or more data attributes associated with the at least one input data;

fetch at least one data serialization and configuration (DSC) object from a database based on the extracted data attributes wherein the one or more processors are coupled to an AI engine to process the extracted data attributes for identifying the DSC object to be fetched; and identify and deploy one or application deployment pipelines based on the fetched DSC object to structure the one or more applications.

32. The non-transitory computer program product of claim 31, wherein the one or more processors are configured to create data serialization and configuration (DSC) object by:

executing a matching operation for the one or more data attributes of the received input data to determine existence of the one or more data attributes related DSC object in the database; and in response to determination of the DSC object, fetching the object from the database, else creating the at least one DSC object based on the received input data, a master DSC object and AI processing of one or more DSC data libraries.

33. The computer program product of claim 32, wherein the one or more processors are configured to:
create a platform data/code structure based on the one or more data attributes associated with the received one or more input data and at least one platform code structure template;
transfer by the at least one data serialization and configuration (DSC) object, one or more values associated with the received input data to a master data serialization and configuration (MDSC) object;
create the at least one data serialization and configuration (DSC) object based on one or more input data received at the interface, the master data serialization and configuration (MDSC) object and the one or more data serialization and configuration (DSC) data libraries, wherein the AI engine coupled to the one or more processors identifies one or more data elements from the one or more DSC libraries and injects the data elements in a master template of the (MDSC) for creating the DSC object; and
inject the platform data structure and the at least one data serialization and configuration (DSC) object for identifying the pipeline to structure the one or more application.

* * * * *